(12) United States Patent
Dubrovsky et al.

(10) Patent No.: US 10,893,787 B2
(45) Date of Patent: Jan. 19, 2021

(54) REMOTE CONTROL SCHEDULER AND METHOD FOR AUTONOMOUS ROBOTIC DEVICE

(71) Applicant: iRobot Corporation, Bedord, MA (US)

(72) Inventors: Zivthan A. Dubrovsky, Waltham, MA (US); Gregg W. Landry, Gloucester, MA (US); Michael J. Halloran, Bedford, MA (US); James Lynch, Georgetown, MA (US)

(73) Assignee: iRobot Corporation, Bedford, MA (US)

( * ) Notice: Subject to any disclaimer, the term of this patent is extended or adjusted under 35 U.S.C. 154(b) by 232 days.

(21) Appl. No.: 15/340,250

(22) Filed: Nov. 1, 2016

(65) Prior Publication Data

US 2017/0113354 A1 Apr. 27, 2017

Related U.S. Application Data

(63) Continuation of application No. 14/670,572, filed on Mar. 27, 2015, now Pat. No. 9,486,924, which is a
(Continued)

(51) Int. Cl.
*A47L 11/40* (2006.01)
*G05B 19/409* (2006.01)
(Continued)

(52) U.S. Cl.
CPC ......... *A47L 11/4011* (2013.01); *B25J 9/1674* (2013.01); *B25J 13/00* (2013.01);
(Continued)

(58) Field of Classification Search
CPC ........ B25J 13/006; B25J 13/00; B25J 9/1674; G05B 19/409; G05B 2219/34456;
(Continued)

(56) References Cited

U.S. PATENT DOCUMENTS

| 500,976 A | 7/1893 | Tangenberg |
| 1,417,768 A | 5/1922 | Radimak |

(Continued)

FOREIGN PATENT DOCUMENTS

| DE | 19849978 | 2/2001 |
| EP | 1243218 | 9/2002 |

(Continued)

OTHER PUBLICATIONS

[No Author Listed] Archer GP1U52X Datasheet, Archer, 1988.
(Continued)

*Primary Examiner* — Nicholas Kiswanto
(74) *Attorney, Agent, or Firm* — Fish & Richardson P.C.

(57) ABSTRACT

A method of scheduling a robotic device enables the device to run autonomously based on previously loaded scheduling information. The method consists of a communication device, such as a hand-held remote device, that can directly control the robotic device, or load scheduling information into the robotic device such that it will carry out a defined task at the desired time without the need for farther external control. The communication device can also be configured to load a scheduling application program into an existing robotic device, such that the robotic device can receive and implement scheduling information from a user.

24 Claims, 6 Drawing Sheets

Related U.S. Application Data continuation of application No. 11/166,891, filed on Jun. 24, 2005, now Pat. No. 9,008,835.

(60) Provisional application No. 60/582,531, filed on Jun. 24, 2004.

(51) Int. Cl.
  *G05D 1/00* (2006.01)
  *G05D 1/02* (2020.01)
  *B25J 9/16* (2006.01)
  *B25J 13/00* (2006.01)

(52) U.S. Cl.
  CPC .......... *B25J 13/006* (2013.01); *G05B 19/409* (2013.01); *G05D 1/0016* (2013.01); *G05D 1/0022* (2013.01); *G05D 1/0033* (2013.01); *G05D 1/0088* (2013.01); *G05D 1/0225* (2013.01); *G05D 1/0242* (2013.01); *G05D 1/0274* (2013.01); *G05B 2219/34456* (2013.01); *G05B 2219/36159* (2013.01); *G05B 2219/45098* (2013.01); *G05D 2201/0203* (2013.01); *G05D 2201/0215* (2013.01); *Y10S 901/02* (2013.01)

(58) Field of Classification Search
  CPC ....... G05B 2219/36159; G05D 1/0016; G05D 1/0022; G05D 1/0033; G05D 1/0225; G05D 1/0242; G05D 1/0274; G05D 2201/0203; G05D 2201/0215; Y10S 901/02
  See application file for complete search history.

(56) References Cited

U.S. PATENT DOCUMENTS

| | | |
|---|---|---|
| 2,770,825 A | 11/1956 | Pullen |
| 2,868,321 A | 1/1959 | Kelly |
| 2,892,511 A | 6/1959 | Gall |
| 4,028,765 A | 6/1977 | Liebscher |
| 4,118,208 A | 10/1978 | Klinedinst |
| 4,152,703 A | 5/1979 | Ziemke et al. |
| 4,328,545 A | 5/1982 | Halsall et al. |
| 4,482,960 A | 11/1984 | Pryor |
| 4,638,445 A | 1/1987 | Mattaboni |
| 4,638,446 A | 1/1987 | Palmberg |
| 4,679,152 A | 7/1987 | Perdue |
| 4,691,101 A | 9/1987 | Leonard |
| 4,790,402 A | 12/1988 | Field |
| 4,817,000 A | 3/1989 | Eberhardt |
| 4,920,520 A | 4/1990 | Gobel |
| 4,932,489 A | 6/1990 | Evans |
| 4,933,864 A | 6/1990 | Evans et al. |
| 4,936,676 A | 6/1990 | Stauffer |
| 4,947,094 A | 8/1990 | Dyer |
| 4,954,962 A | 9/1990 | Evans et al. |
| 4,967,862 A | 11/1990 | Pong et al. |
| 5,001,635 A | 3/1991 | Yasutomi et al. |
| 5,032,775 A | 7/1991 | Mizuno et al. |
| 5,051,906 A | 9/1991 | Evans et al. |
| 5,109,566 A | 5/1992 | Kobayashi et al. |
| 5,165,064 A | 11/1992 | Mattaboni |
| 5,204,814 A | 4/1993 | Noonan et al. |
| 5,213,176 A | 5/1993 | Oroku |
| 5,220,263 A | 6/1993 | Onishi et al. |
| 5,245,177 A | 9/1993 | Schiller |
| 5,279,672 A | 1/1994 | Betker et al. |
| 5,293,955 A | 3/1994 | Lee |
| 5,307,271 A | 4/1994 | Everett et al. |
| 5,321,614 A | 6/1994 | Ashworth |
| 5,341,540 A | 8/1994 | Soupert et al. |
| 5,345,649 A | 9/1994 | Whitlow |
| 5,353,224 A | 10/1994 | Lee et al. |
| 5,410,479 A | 4/1995 | Coker |
| 5,440,216 A | 8/1995 | Kim |
| 5,453,931 A | 9/1995 | Watts, Jr. |
| 5,483,440 A | 1/1996 | Aono et al. |
| 5,525,883 A | 6/1996 | Avitzour |
| 5,528,888 A | 6/1996 | Miyamoto et al. |
| 5,548,511 A | 8/1996 | Bancroft |
| 5,608,306 A | 3/1997 | Rybeck et al. |
| 5,634,237 A | 6/1997 | Paranjpe |
| 5,646,494 A | 7/1997 | Han |
| 5,659,779 A | 8/1997 | Laird et al. |
| 5,677,836 A | 10/1997 | Bauer |
| 5,682,313 A | 10/1997 | Edlund et al. |
| 5,710,506 A | 1/1998 | Broell et al. |
| 5,740,581 A | 4/1998 | Harreslon, II |
| 5,770,936 A | 6/1998 | Hirai et al. |
| 5,787,545 A | 8/1998 | Coleus |
| 5,839,156 A * | 11/1998 | Park .................. A47L 5/30 15/339 |
| 5,841,259 A | 11/1998 | Kim et al. |
| 5,901,409 A | 5/1999 | Schick |
| 5,926,909 A | 7/1999 | McGee |
| 5,935,179 A | 8/1999 | Kleiner et al. |
| 5,940,930 A | 8/1999 | Oh et al. |
| 5,942,869 A | 8/1999 | Katou et al. |
| 5,959,423 A | 9/1999 | Nakanishi et al. |
| 5,995,884 A | 11/1999 | Allen et al. |
| 6,009,359 A | 12/1999 | El-Hakim et al. |
| 6,076,025 A | 6/2000 | Ueno et al. |
| 6,076,226 A | 6/2000 | Reed |
| 6,094,775 A | 8/2000 | Behmer |
| 6,170,242 B1 | 1/2001 | Gordon |
| 6,260,645 B1 | 7/2001 | Pawlowski |
| 6,272,712 B1 | 8/2001 | Gockel et al. |
| 6,292,712 B1 | 9/2001 | Bullen |
| 6,324,462 B1 | 11/2001 | Kageyama |
| 6,336,051 B1 | 1/2002 | Pangels et al. |
| 6,339,735 B1 | 1/2002 | Peless et al. |
| 6,370,452 B1 * | 4/2002 | Pfister .................. G05D 1/0297 701/23 |
| 6,370,453 B2 | 4/2002 | Sommer |
| 6,389,329 B1 | 5/2002 | Colens |
| 6,457,206 B1 | 10/2002 | Judson |
| 6,459,955 B1 | 10/2002 | Bartsch et al. |
| 6,481,515 B1 | 11/2002 | Kirkpatrick et al. |
| 6,493,612 B1 | 12/2002 | Bisset et al. |
| 6,496,754 B2 | 12/2002 | Song et al. |
| 6,496,755 B2 | 12/2002 | Wallach et al. |
| 6,532,404 B2 | 3/2003 | Colens |
| 6,535,793 B2 | 3/2003 | Allard |
| 6,574,536 B1 | 6/2003 | Kawagoe et al. |
| 6,584,376 B1 | 6/2003 | Van Kommer |
| 6,594,844 B2 | 7/2003 | Jones |
| 6,597,076 B2 | 7/2003 | Scheible et al. |
| 6,615,108 B1 | 9/2003 | Peless et al. |
| 6,615,446 B2 | 9/2003 | Noreen et al. |
| 6,658,325 B2 | 12/2003 | Zweig |
| 6,690,134 B1 | 2/2004 | Jones et al. |
| 6,712,868 B2 | 3/2004 | Murphy et al. |
| 6,732,826 B2 | 5/2004 | Song et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,830,120 B1 | 12/2004 | Yashima et al. |
| 6,845,297 B2 | 1/2005 | Allard |
| 6,859,010 B2 | 2/2005 | Jeon et al. |
| 6,868,307 B2 | 3/2005 | Song |
| 6,941,199 B1 | 9/2005 | Bottomley et al. |
| 6,957,712 B2 | 10/2005 | Song et al. |
| 6,965,209 B2 | 11/2005 | Jones et al. |
| 7,041,029 B2 | 5/2006 | Fulghum et al. |
| 7,042,342 B2 | 5/2006 | Luo et al. |
| 7,054,716 B2 * | 5/2006 | McKee ................ G05D 1/0251 318/568.1 |
| 7,155,308 B2 | 12/2006 | Jones |
| 7,173,391 B2 | 2/2007 | Jones et al. |
| 7,196,487 B2 | 3/2007 | Jones et al. |
| 7,201,786 B2 | 4/2007 | Wegelin et al. |
| 7,218,994 B2 | 5/2007 | Kanda |

(56) References Cited

U.S. PATENT DOCUMENTS

| | | |
|---|---|---|
| 7,388,343 B2 | 6/2008 | Jones et al. |
| 7,388,879 B2 * | 6/2008 | Sabe .............. H04L 67/10 370/328 |
| 7,389,156 B2 | 6/2008 | Ziegler et al. |
| 7,412,748 B2 | 8/2008 | Lee et al. |
| 7,448,113 B2 | 11/2008 | Jones et al. |
| 7,480,958 B2 | 1/2009 | Song |
| 7,513,007 B2 | 4/2009 | Chernoff |
| 7,571,511 B2 | 8/2009 | Jones et al. |
| 7,636,982 B2 | 12/2009 | Jones et al. |
| 7,706,917 B1 | 4/2010 | Chiappetta et al. |
| 7,729,801 B2 | 6/2010 | Abramson |
| 7,761,954 B2 | 7/2010 | Ziegler et al. |
| 7,779,504 B2 | 8/2010 | Lee et al. |
| 7,805,220 B2 | 9/2010 | Taylor et al. |
| 7,849,555 B2 | 12/2010 | Hahm et al. |
| 7,860,680 B2 | 12/2010 | Arms et al. |
| 7,873,448 B2 | 1/2011 | Takeda |
| 8,396,599 B2 | 3/2013 | Matsuo et al. |
| 8,474,090 B2 | 7/2013 | Jones et al. |
| 8,600,553 B2 | 12/2013 | Svendsen et al. |
| 9,038,233 B2 | 5/2015 | Jones et al. |
| 9,215,957 B2 | 12/2015 | Cohen |
| 9,486,924 B2 | 11/2016 | Dubrovsky et al. |
| 2002/0016649 A1 | 2/2002 | Jones |
| 2002/0030142 A1 | 3/2002 | James |
| 2002/0060542 A1 | 5/2002 | Song et al. |
| 2002/0120364 A1 | 8/2002 | Colens |
| 2002/0124343 A1 | 9/2002 | Reed |
| 2002/0153185 A1 | 10/2002 | Song et al. |
| 2002/0156556 A1 | 10/2002 | Ruffner |
| 2002/0180585 A1 | 12/2002 | Kim et al. |
| 2002/0193908 A1 | 12/2002 | Parker |
| 2003/0009261 A1 | 1/2003 | Parker |
| 2003/0025472 A1 | 2/2003 | Jones et al. |
| 2003/0030398 A1 * | 2/2003 | Jacobs .............. G05D 1/0225 318/568.12 |
| 2003/0034898 A1 | 2/2003 | Shamoon |
| 2003/0090522 A1 | 5/2003 | Verhaar |
| 2003/0120389 A1 | 6/2003 | Abramson et al. |
| 2003/0165373 A1 | 9/2003 | Felder et al. |
| 2004/0020000 A1 | 2/2004 | Jones |
| 2004/0049877 A1 | 3/2004 | Jones et al. |
| 2004/0056651 A1 | 3/2004 | Marietta Bersana |
| 2004/0083570 A1 | 5/2004 | Song et al. |
| 2004/0088081 A1 | 5/2004 | Song et al. |
| 2004/0143927 A1 | 7/2004 | Haegermarck |
| 2004/0158357 A1 | 8/2004 | Lee et al. |
| 2004/0187457 A1 | 9/2004 | Colens |
| 2004/0201361 A1 | 10/2004 | Koh et al. |
| 2004/0204804 A1 | 10/2004 | Lee et al. |
| 2004/0207355 A1 | 10/2004 | Jones et al. |
| 2004/0211444 A1 | 10/2004 | Taylor et al. |
| 2004/0220707 A1 | 11/2004 | Pallister |
| 2004/0236468 A1 | 11/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0015920 A1 | 1/2005 | Kim et al. |
| 2005/0067994 A1 | 3/2005 | Jones et al. |
| 2005/0113972 A1 | 5/2005 | Kumhyr |
| 2005/0132680 A1 | 6/2005 | Wegelin et al. |
| 2005/0150519 A1 | 7/2005 | Keppler et al. |
| 2005/0171636 A1 | 8/2005 | Tani |
| 2005/0171637 A1 | 8/2005 | Tani |
| 2005/0183229 A1 | 8/2005 | Uehigashi |
| 2005/0192707 A1 | 9/2005 | Park et al. |
| 2005/0204505 A1 * | 9/2005 | Kashiwagi ............ G05D 1/027 15/319 |
| 2005/0204717 A1 | 9/2005 | Colens |
| 2006/0220900 A1 | 10/2006 | Ceskutti et al. |
| 2006/0293788 A1 | 12/2006 | Pogodin |
| 2007/0157415 A1 | 7/2007 | Lee et al. |
| 2007/0157420 A1 | 7/2007 | Lee et al. |
| 2007/0226949 A1 | 10/2007 | Hahm et al. |
| 2007/0245511 A1 | 10/2007 | Hahm et al. |
| 2007/0266508 A1 | 11/2007 | Jones et al. |
| 2007/0271011 A1 | 11/2007 | Lee |
| 2008/0039974 A1 | 2/2008 | Sandin et al. |
| 2008/0052846 A1 | 3/2008 | Kapoor et al. |
| 2008/0109126 A1 | 5/2008 | Sandin et al. |
| 2008/0140255 A1 | 6/2008 | Ziegler et al. |
| 2008/0155768 A1 | 6/2008 | Ziegler et al. |
| 2008/0161969 A1 | 7/2008 | Lee et al. |
| 2008/0266748 A1 | 10/2008 | Lee |
| 2008/0307590 A1 | 12/2008 | Jones et al. |
| 2009/0049640 A1 | 2/2009 | Lee et al. |
| 2009/0102296 A1 | 4/2009 | Greene et al. |
| 2010/0011529 A1 | 1/2010 | Won et al. |
| 2010/0049365 A1 | 2/2010 | Jones et al. |
| 2010/0082193 A1 | 4/2010 | Chiappetta |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0269142 A1 | 10/2010 | Jones et al. |
| 2011/0020175 A1 | 1/2011 | Collard et al. |
| 2012/0168240 A1 | 7/2012 | Wilson |
| 2012/0259481 A1 | 10/2012 | Kim |
| 2014/0316636 A1 | 10/2014 | Hong |

FOREIGN PATENT DOCUMENTS

| | | |
|---|---|---|
| EP | 1331537 | 7/2003 |
| ES | 2238196 | 8/2005 |
| GB | 1062102 | 3/1967 |
| JP | 5257533 | 10/1993 |
| JP | H09269810 | 10/1997 |
| JP | 11212642 | 8/1999 |
| JP | 2001212052 | 8/2001 |
| JP | 2001321308 | 11/2001 |
| JP | 2002-244731 | 8/2002 |
| JP | 2002321180 | 11/2002 |
| JP | 2002345706 | 12/2002 |
| JP | 2002354139 | 12/2002 |
| JP | 2004136144 | 5/2004 |
| JP | 2004283327 | 10/2004 |
| JP | 2005124753 | 5/2005 |
| JP | 2005204909 | 8/2005 |
| JP | 2000207215 | 7/2008 |
| KR | 2003016807 | 3/2003 |
| KR | 657736 | 12/2006 |
| KR | 2007103248 | 10/2007 |
| KR | 2007112908 | 11/2007 |
| WO | 199303399 | 1/1993 |
| WO | 199928806 | 6/1999 |
| WO | 200038025 | 6/2000 |
| WO | 200038026 | 6/2000 |
| WO | 200004430 | 10/2000 |
| WO | 2002006744 | 9/2002 |
| WO | 2005055795 | 6/2005 |
| WO | 2007088192 | 8/2007 |

OTHER PUBLICATIONS

[No Author Listed] "Handbook of Photoelectric Sensing," Banner Engineering Corp., 1993.
[No Author Listed] "Sharp GP1U52X Datasheet," Sharp, Before 1988.
[No Author Listed] "Sharp GP2D02 Datasheet," Sharp, Before 1988.
[No Author Listed] "Subsumption Robotics," Naval Explosive Ordnance Disposal Technology Division, 1998.
[No Author Listed] "Trilobite Instruction Manual," Electrolux, Dec. 1, 2001.
[No Author Listed] Cye Robot, Probiotics, Inc., 1999, 27 pages.
[No Author Listed] Dyson DC-06, Dyson, Feb. 29, 2000, 1 page.
[No Author Listed] Electrolux Tribolite, Electrolux, Dec. 2001, 60 pages.
[No Author Listed] HelpMate Robot, Transitions Research Corp., Prior to 1991, pages.
[No Author Listed] Karcher Robot, Karcher, 2002, 18 pages.

(56) References Cited

OTHER PUBLICATIONS

[No Author Listed] Robart I, H.R. Everett, 1980-1985, 10 pages.
[No Author Listed] Robart II, H.R. Everett, Naval Command Control and Ocean Surveillance Center, 1982-1987, 10 pages.
[No Author Listed] RoboScrub Robot, Windsor Corp. Oct. 1991, 682 pages.
[No Author Listed] Roomba 500 Series robot, iRobot, 14 pages.
[No Author Listed] Rug Warrior I and II, A.K. Peters, 1998, 241 pages.
[No Author Listed] Suckmaster II, Dale Heatherington, Atlanta Hobby, Robot Club, Feb. 2002, 41 pages.
[No Author Listed] Tute Robot, A.K. Peters, 1998, 241 pages.
[No Author Listed] Uranus Mobile Robot, Carnegie Mellon University, 1985, 3 pages.
Blackwell, "The Uranus Mobile Robot," Carnegie Mellon University, 1991, 33 pages.
Evans et al., Handling Real-World Motion Planning: A Hospital Transport Robot ("Evans Article"), 1992, 6 pages.
Exhibit 1001 in Petition for Inter Partes Review of U.S. Pat. No. 9,486,924, dated Sep. 5, 2017, 28 pages.
Exhibit 1002 in Petition for Inter Partes Review of U.S. Pat. No. 9,486,924, dated Sep. 5, 2017, 287 pages.
Exhibit 1003 in Petition for Inter Partes Review of U.S. Pat. No. 9,486,924, dated Sep. 5, 2017, 67 pages.
Exhibit 1004 in Petition for Inter Partes Review of U.S. Pat. No. 9,486,924, dated Sep. 5, 2017, 46 pages.
Exhibit 1005 in Petition for Inter Partes Review of U.S. Pat. No. 9,486,924, dated Sep. 5, 2017, 11 pages.
Exhibit 1006 in Petition for Inter Partes Review of U.S. Pat. No. 9,486,924, dated Sep. 5, 2017, 07 pages.
Exhibit 1007 in Petition for Inter Partes Review of U.S. Pat. No. 9,486,924, dated Sep. 5, 2017, 130 pages.
Exhibit 1008 in Petition for Inter Partes Review of U.S. Pat. No. 9,486,924, dated Sep. 5, 2017, 1 page.
Exhibit 1009 in Petition for Inter Partes Review of U.S. Pat. No. 9,486,924, dated Sep. 5, 2017, 1 page.
Expert Report of John Martens Ph.D. in the Matter of Certain Robotic Vacuum Cleaning Devices and Components Thereof Such as Spare Parts, Investigation No. 337-TA-1057, dated Nov. 29, 2017, 417 pages.
Expert Report of William Messner in the Matter of Certain Robotic Vacuum Cleaning Devices and Components Thereof Such as Spare Parts, Investigation No. 337-TA-1057, dated Nov. 29, 2017, 140 pages.
Gomes et al., Autonomous Mobile Robots Final Report: Vacuum Cleaning Robot by ("Gomes"), 1995, 9 pages.
Hafner, "Web Phones: The Next Big Thing," New York Times, Apr. 15, 1999, 7 pages.
Hitoshi, "Vacuum Cleaner Robot Operated in Conjunction with 3G Cellular Phone," Toshiba, Oct. 2003, 7 pages.
Horowitz and Hill, "The Art of Electronics," Cambridge University Press, 1988, 58 pages.
Johnston, Optical Proximity Sensing for Manipulators, Technical Report JPLTM 33-12, Jet Propulsion Laboratory, 1973, 21 pages.
Jones & Flynn, "Mobile Robots—Inspiration to Implementation ($1^{st}$ ed.)," A.K. Peters, 1993, 190 pages.
Jones, Flynn & Seiger, "Mobile Robot—Inspiration to Implementation ($2^{nd}$ ed.)," A.K. Peters, 1993, 241 pages.
Kinkoph, "The Complete Idiot's Guide to Microsoft Office 95," Que Publishing, 1995, 81 pages.
Nokia, "Nokia 9000i1 Communicator," Nokia, 1998, 162 pages.
Petition for Inter Partes Review of U.S. Pat. No. 9,486,924, dated Sep. 5, 2017, 56 pages.
Pook et al., "Test Bed Robot Development for Cooperative Submunitions Clearance," International Journal of Robotics Research, 1999, 7 pages.
Prassler et al., "A Short History of Cleaning Robots," Autonomous Robots 9, 211-226, 2000, 16 pages.

Respondents' Disclosure of Invalidity Contentions, in the Matter of Certain Robotic Vacuum Cleaning Devices and Components Thereof Such as Spare Parts, Investigation No. 337-TA-1057, dated Sep. 29, 2017, 95 pages.
Respondents' Disclosure of Invalidity Contentions, in the Matter of Certain Robotic Vacuum Cleaning Devices and Components Thereof Such as Spare Parts, "Appendix A—'490 Claim Charts," Investigation No. 337-TA-1057, dated Sep. 29, 2017, 56 pages.
Respondents' Disclosure of Invalidity Contentions, in the Matter of Certain Robotic Vacuum Cleaning Devices and Components Thereof Such as Spare Parts, "Appendix B—'308 Claim Charts," Investigation No. 337-TA-1057, dated Sep. 29, 2017, 173 pages.
Respondents' Disclosure of Invalidity Contentions, in the Matter of Certain Robotic Vacuum Cleaning Devices and Components Thereof Such as Spare Parts, "Appendix C—'090 Claim Charts," Investigation No. 337-TA-1057, dated Sep. 29, 2017, 116 pages.
Respondents' Disclosure of Invalidity Contentions, in the Matter of Certain Robotic Vacuum Cleaning Devices and Components Thereof Such as Spare Parts, "Appendix D—'553 Claim Charts," Investigation No. 337-TA-1057, dated Sep. 29, 2017, 270 pages.
Respondents' Disclosure of Invalidity Contentions, in the Matter of Certain Robotic Vacuum Cleaning Devices and Components Thereof Such as Spare Parts, "Appendix E—'233 Claim Charts," Investigation No. 337-TA-1057, dated Sep. 29, 2017, 136 pages.
Respondents' Disclosure of Invalidity Contentions, in the Matter of Certain Robotic Vacuum Cleaning Devices and Components Thereof Such as Spare Parts, "Appendix F—'924 Claim Charts," Investigation No. 337-TA-1057, dated Sep. 29, 2017, 32 pages.
Sekman, "Human Robot Interaction via Cellular Phones," IEEE, 2003, 6 pages.
The Mobile Robot Laboratory, "Autonomous Mobile Robots," Carnegie Mellon University, 1985, 162 pages.
You, "Development of a Home Service Robot, 'ISSAC'," IEEE, Oct. 2003, 6 pages.
Doty et al., "Sweep Strategies for a Sensory-Driven, Behavior-Based Vacuum Cleaning Agent," AAAI 1993 Fall Symposium Series, Instantiating Real-World Agents, pp. 1-6, Oct. 22-24, 1993.
Electrolux "Welcome to the Electrolux trilobite" www.electroluxusa.com/node57.asp?currentURL=node142.asp%3F, 2 pages, Mar. 18, 2005.
Everett, H.R., "Sensors for Mobile Robots," AK Peters, Ltd., Wellesley, MA (1995).
Facts on Trilobite, webpage, Retrieved from the Internet: URL< http://trilobiteelectroluxse/presskit_en/model11335asp?print=yes &pressID=>. 2 pages, accessed Dec. 2003.
Hitachi: News release: "The home cleaning robot of the autonomous movement type (experimental machine)," Retrieved from the Internet: URL< www.i4u.com./japanreleases/hitachirobot.htm>. 5 pages, Mar. 2005.
Honda Motor Co., Ltd., English Translation of JP11212642, Aug. 9, 1999, 31 pages.
Jones, J., Roth, D., "Robot Programming: A Practical Guide to Behavior-Based Robotics," McGraw-Hill Education TAB, (Jan. 2, 2004) 288 pages.
Karcher "Karcher RoboCleaner RC 3000," Retrieved from the Internet: URL<www.robocleaner.de/english/screen3.html>. 4 pages, Dec. 2003.
Karcher USA, RC3000 Robotic Cleaner, website: http://www.karcher-usa.com/showproducts.php?op=view prod¶m1=143 ¶m2=&param3=, 3 pages, accessed Mar. 2005.
Karcher, "Product Manual Download 'Karch'," available at www.karcher.com, 16 pages, 2004.
News Archive (2012). Accessed online http://robotbg.com/news/2012/01114/Ig_hom_bot_20_demo_at_ces_2012, 3 pages.
Prassler, et al., English Translation of DE19849978, Feb. 8, 2001, 16 pages.
E-mail Correspondence from Warren K. Mabey, Jr., dated Sep. 11, 2017, 1 page (Exhibit 1009 in IPR2017-02137).
File History for U.S. Appl. No. 14/670,572, filed Mar. 27, 2015, 287 pages (Exhibit 1002 in IPR2017-02137).

(56) References Cited

OTHER PUBLICATIONS

Hafner, "Web Phones: The Next Big Thing?" New York Times, Apr. 15, 1999, URL <http://events.nytimes.com/library/tech/99/04/circuits/articles/15mobi.html?mcubz=0>, 7 pages(Exhibit 1006 in IPR2017-02137).
Nokia 9000il Owner's Manual, © 1995-1998, 130 pages (Exhibit 1007 in IPR2017-02137).
Nokia USA, "Personal Portable Office," NokiaUSA.com, Aug. 15, 2000, URL <https://web.archive.org/web/20000815083826/http://www.nokiausa.com:80/shopnokia1/1.118.L3Bob251cy8xDEwMDMsLEZGLmh0bWw=.00.html>, 1 page (Exhibit 1008 in IPR2017-02137).
*Shenzhen Zhiyi Technology Co. Ltd, D/B/A/ iLife v. iRobot Corp*, Declaration of Charles J. Neuhauser, PhD, in IPR 2017-02137, dated Sep. 22, 2017, 67 pages(Exhibit 1003 in IPR2017-02137).
U.S International Trade Commission, initial Determination on Violation of Section 337, In The Matter of Certain Robotic Vacuum Cleaning Devices and Components Thereof Such as Spare Parts, Investigation No. 337-TA-1057, dated Jun. 25, 2018, 383 pages.
U.S International Trade Commission, Recommended Determination on Remedy and Bond, In The Matter of Certain Robotic Vacuum Cleaning Devices and Components Thereof Such as Spare Parts, Investigation No. 337-TTA-1057, dated Jun. 25, 2018, 18 pages.
U.S. International Trade Commission, Notice of Initial Determination on Violation of Section 337, In the Matter of Certain Robotic Vacuum Cleaning Devices and Components Thereof Such as Spare Parts, Investigation No. 337-TA-1057, dated Jun. 25, 2018, 5 pages.
U.S. Patent Appln. Publication No. 2002/0156556, published on Oct. 24, 2002, Ruffner (Exhibit 1004 in IPR2017-02137).
U.S. Pat. No. 9,486,924, issued on Nov. 8, 2016, Dubrovsky et al. (Exhibit 1001 in IPR2017-02137).
United States International Trade Commission, In the Matter of Certan Robotic Vacuum Cleaning Devices and Components Thereof Such as Spare Parts, Joint Claim Construction Chart, Inv. No. 337-TA-1057, dated Aug. 18, 2017, 2017, 11 pages (Exhibit 1005 in IPR2017-02137).
United States International Trade Commission, In the Matter of Certan Robotic Vacuum Cleaning Devices and Components Thereof Such as Spare Parts, Order No. 27: Construing Terms of the Asserted Patents, Inv. No. 337-TA-1057, dated Nov. 9, 2017, 62 pages (Exhibit 2001 in IPR2017-02137).
Decision of Petition for Inter Partes Review of U.S. Pat. No. 9,486,924, entered Apr. 2, 2018, 28 pages.
Exhibit IR2001 of Patent Owner's Preliminary Response to Petition for Inter Partes Review of U.S. Pat. No. 9,486,924, dated Apr. 2, 2018, 62 pages.
Exhibit IR2002 of Patent Owner's Preliminary Response to Petition for Inter Partes Review of U.S. Pat. No. 9,486,924, dated Apr. 2, 2018, 59 pages.
Patent Owner's Preliminary Response to Petition for Inter Partes Review of U.S. Pat. No. 9,486,924, dated Apr. 2, 2018, 40 pages.
Brain et al., "How Cell Phones Work: Analog Cell Phones," HowStuffWorks, available at https://electronics.howstuffworks.com/cell-phone4.htm, retrieved on or before Jun. 7, 2018, 4 pages (Exhibit 2015 in IPR2017-02137).
David Tipper's Presentation on First Generation Cellular, University of Pittsburgh, Lecture Telecom2720, available on or before Jun. 8, 2018, 24 pages (Exhibit 2014 in IPR2017-02137).
Declaration of Ms. Anne Koch Baland, dated Jan. 4, 2018, 59 pages (Exhibit 2002 in IPR2017-02137).
Excerpt from Nokia 9000 Communicator Specifications, available at https://www.gsmarena.com/nokia_9000_communicator-16.php, retrieved on or before Jun. 8, 2018, 1 page (Exhibit 2009 in IPR2017-02137).
Homepage of Salisbury Robotics Lab at Stanford University, available at https://sr.stanford.edu, retrieved on or before Jun. 7, 2018, 4 pages (Exhibit 2008 in IPR2017-02137).
National Telecommunication and Information Administration Report: How and Where America Goes Online, available at https://www.ntia.doc.gov/legacy/htiahome/dn/html/Chapter4.ht, retrieved on or before Jun. 7, 2018, 6 pages (Exhibit 2012 in IPR2017-02137).
Newburger, "US Census Bureau Report: Home Computers and Internet Use in the United States: Aug. 2000," issued in Sep. 2001, 10 pages (Exhibit 2011 in IPR2017-02137).
*Shenzhen Zhiyi Technology Co. Ltd, D/B/A/ iLife v. iRobot Corp*, Motion to Terminate, in IPR 2017-02137, dated Oct. 15, 2018, 4 pages.
*Shenzhen Zhiyi Technology Co. Ltd. D/B/A/ iLife, v. iRobot Corporation*, Patent Owner's Response Under 37 C.F.R. 42.120, in case IPR2017-02137, U.S. Pat. No. 9,486,924, dated Jun. 8, 2018, 59 pages.
*Shenzhen Zhiyi Technology Co. Ltd., D/B/A/ iLife, v. iRobot Corp.*, Transcript of Deposition of Charles J. Neuhauser, Ph.D. in case IPR2017-02137, U.S. Pat. No. 9,846,924, May 23, 2018, 75 pages (Exhibit 2004 in IPR2017-02137).
*Shenzhen Zhiyi Technology Co. Ltd., D/B/A/ iLife, v. iRobot Corporation*, Petitioner's Unopposed Motion for Pro Hac Vice Admission of Stephen M. Ullmer Under 37 C.F.R.42.10(c), in case IPR2017-02137, U.S. Pat. No. 9,486,924, dated May 1, 2018, 6 pages.
*Shenzhen Zhiyi Technology Co. Ltd., D/B/A/ iLife, v. iRobot Corporation*, Petitioner's Unopposed Motion for Pro Hac Vice Admission of Nicholas A. Brown Under 37 C.F.R.42.10(c), in case IPR2017-02137, U.S. Pat. No. 9,486,924, dated May 1, 2018, 6 pages.
*Shenzhen Zhiyi Tehcnology Co. Ltd., D/B/A iLife, v. iRobot Corp.*, Declaration of Kenneth Salisbury, Ph.D., in case IPR2017-02137, U.S. Pat. No. 9,846,924, dated Jun. 8, 2018, 82 pages (Exhibit 2003 in IPR2017-02137).
The American Heritage Dictionary, 4th edition, 2000, select portions (p. 1557), 3 pages (Exhibit 2005 in IPR2017-02137).
The New Oxford American Dictionary, 2001, select portions (pp. 1523-1524), 4 pages (Exhibit 2006 in IPR2017-02137).
U.S. International Trade Commission, In the Matter of Certain Robotic Vacuum Cleaning Devices and Components Thereof Such as Spare Parts, Investigation No. 337-TA-1057, Notice of the Commission's Final Determination Finding a Violation of Section 337; Issuance of a Limited Exclusion Order and Cease and Desist Orders; Termination of the Investigation, dated Nov. 30, 2018 5 pages.
United States Patent and Trademark Office Presentation on "Best Practices for Proving a Document is a Printed Publication," Dec. 7, 2017, 26 pages (Exhibit 2007 in IPR2017-02137).
What is DTMF Tone, Specialty Answering Service, available at https://www.specialtyansweringservice.net/wp-content/uploads/resources_papers/dtmf-tone/Dual-Tone-Multi-Frequency-Signaling.pdf, retrieved on or before Jun. 8, 2018, 18 pages (Exhibit 2013 in IPR2017-02137).
U.S. International Trade Commission, Commission Opinion, in the Matter of Certain Robotic Vacuum Cleaning Devices and Components Thereof Such as Spare Parts, Investigation No. 337-TA-1057, dated Feb. 1, 2019, 74 pages.
*Sharkninja Operating LLC, Sharkninja Management LLC, and Sharkninja Sales Company*, v. *iRobot Corporation*, "Granting Institution for Inter Partes Review," IPR2020-00735, for U.S. Pat. No. 10,045,676, filed Oct. 13, 2020, 13 pages.
[No Author Listed], "JS Global 2019 Annual Report," JS Global Lifestyle Company Limited, 2019, 214 pages (Exhibit No. 2004).
[No Author Listed], "JS Global Chief of Staff to the President," LinkedIn, 2020, retrieved from URL: https://www.linkedin.com/jobs/view/js-global-chief-of-staff-to-the-president-at-sharkninja-1788698348/, retrieved on Mar. 31, 2020, 3 pages (Exhibit No. 2006).
[No Author Listed], "JS Global Offering," JS Global, Oct. 2019, 565 pages (Exhibit No. 2002).
[No Author Listed], "JS Global: Environmental, Social, and Governance Report," JS Global, 2019, 51 pages (Exhibit No. 2007).
[No Author Listed], "Management Team—JS Global," JS Global, 2019, retrieved from URL: https://www.jsgloballife.com/management-team, retrieved on Jun. 27, 2020, 3 pages (Exhibit No. 2003).

(56) References Cited

OTHER PUBLICATIONS

[No Author Listed], "People & culture," SharkNinja, 2020, retrieved from URL: https://m.sharkninja.com/people-and-culture/, retrieved on Jun. 27, 2020, 9 pages (Exhibit No. 2005).

[No Author Listed], "Post Hearing Information Pack of JS Global Lifestyle Company Limited," JS Global, 2019, 564 pages (Exhibit No. 2009).

[No Author Listed], "SharkNinja Management LLC 2020 Annual Report, Massachusetts," The Commonwealth of Massachusetts, 2020, 3 pages (Exhibit No. 2010).

[No Author Listed], "SharkNinja Sales Co. 2019 Annual Report, Massachusetts," The Commonwealth of Massachusetts, 2019, 2 pages (Exhibit No. 2011).

*iRobot Corporation v. Sharkninja Operating LLC, Sharkninja Management LLC, and Sharkninja Sales Company*, "Complaint for Patent Infringement," Civil Action No. DMA-1-19-cv-12125-1, dated Oct. 15, 2019, 20 pages (Exhibit No. 2012).

*iRobot Corporation v. Sharkninja Operating LLC, Sharkninja Management LLC, and Sharkninja Sales Company*, "Transcript of Hearing Before the Honorable Allison D. Burroughs," Civil Action No. 19-cv-12125-ADB, dated Oct. 25, 2019, 33 pages (Exhibit No. 2008).

*Sharkninja Operating LLC, Sharkninja Management LLC, and Sharkninja Sales Company v. iRobot Corporation*, "Declaration of Timothy Johnston," Case No. IPR2020-00735, U.S. Pat. No. 10,045,676, filed Aug. 7, 2020, 4 pages (Exhibit No. 1025).

*Sharkninja Operating LLC, Sharkninja Management LLC, and Sharkninja Sales Company v. iRobot Corporation*, "Patent Owner's Preliminary Response," Case No. IPR2020-00735, U.S. Pat. No. 10,045,676, dated Jul. 14, 2020, 16 pages.

*Sharkninja Operating LLC, Sharkninja Management LLC, and Sharkninja Sales Company v. iRobot Corporation*, "Patent Owner's Preliminary Sur-Reply," Case No. IPR2020-00735, U.S. Pat. No. 10,045,676, filed Aug. 14, 2020, 9 pages.

*Sharkninja Operating LLC, Sharkninja Management LLC, and Sharkninja Sales Company v. iRobot Corporation*, "Petitioners' Reply to Patent Owner Preliminary Response," Case No. IPR2020-00735, U.S. Pat. No. 10,045,676, filed Aug. 7, 2020, 9 pages.

*Sharkninja Operating LLC, Sharkninja Management LLC, and Sharkninja Sales Company v. iRobot Corporation*, "Petitioners' Updated Exhibit List," Case No. IPR2020-00735, U.S. Pat. No. 10,045,676, filed Aug. 7, 2020, 4 pages.

[No Author Listed], "Roboking—not just a vacuum cleaner, a robot!," infocom.uz, Jan. 21, 2004, obtained from the Internet on Aug. 13, 2012, 5 pages.

[No Author Listed], "Manual for Friendly Vac RV400" Friendly Robotics, © 2005, 24 pages.

[No Author Listed], "Manual for Orazio," Zucchetti, (undated), 84 pages.

[No Author Listed], "Manual for RC 3000," produced by Karcher, © 2012, 18 pages.

[No Author Listed], "Manual for SEBO Automatic X1 Manual," SEBO, (undated), 15 pages.

[No Author Listed], "Manual for the Cye1 produced by Probotics, Inc.," Probotics, Inc., (undated), 6 pages.

[No Author Listed], "Manual for Trilobite ZA1," Electrolux, © 2001, 18 pages.

[No Author Listed], "Samsung Unveils High-tech Robot Vacuum Cleaner," Mobilemag, Nov. 25, 2003, 2 pages.

[No Author Listed], "Samsung Unveils Its Multifunction Robot Vacuum," iirobotics.com, Aug. 31, 2004, 1 page.

[No Author Listed], "Servus Robots: Cleaning Robot," Servus Robots, (undated), retrieved on Jun. 10, 2020, 1,901 pages.

Certified English Translation of JP Patent No. 2000-342496, issued on Dec. 12, 2000, Ichijo (Exhibit 1016 in IPR2020-00735).

Certified English Translation of JP Patent No. 2002-85305, issued on Mar. 26, 2002, Sano et al. (Exhibit No. 1007 in IPR2020-00735).

Certified English Translation of JP Patent No. 2003-62776, issued on Mar. 5, 2003, Otsu (Exhibit No. 1013 in IPR2020-00735).

Christensen et al., "BeeSoft™ User's Guide and Software Reference," Real World Interface, Inc., © 1997, 196 pages.

Curriculum Vitae of Alonzo Kelly, (undated), 44 pages (Exhibit No. 1005 in IPR2020-00735).

File History for U.S. Appl. No. 15/495,153, filed Apr. 24, 2017, 256 pages (Exhibit No. 1002 in IPR2020-00735).

Harper, "Inside the Smart Home," Springer, © 2003, 278 pages (Exhibit No. 1022 in IPR2020-00735).

*iRobot Corporation v. Sharkninja Operating LLC et al.*, SharkNinja's Invalidity Contentions Appendix E1, Civil Action No. 1:19-cv-12125-ADB (D. Mass.), dated Mar. 19, 2020, 140 pages.

*iRobot Corporation v. Sharkninja Operating LLC et al.*, SharkNinja's Invalidity Contentions Appendix E2, Civil Action No. 1:19-cv-12125-ADB (D. Mass.), dated Mar. 19, 2020, 95 pages.

*iRobot Corporation v. Sharkninja Operating LLC et al.*, SharkNinja's Invalidity Contentions Appendix E3, Civil Action No. 1:19-cv-12125-ADB (D. Mass.), dated Mar. 19, 2020, 97 pages.

*iRobot Corporation v. Sharkninja Operating LLC et al.*, SharkNinja's Invalidity Contentions Appendix E4, Civil Action No. 1:19-cv-12125-ADB (D. Mass.), dated Mar. 19, 2020, 92 pages.

*iRobot Corporation v. Sharkninja Operating LLC et al.*, SharkNinja's Invalidity Contentions Appendix E5, Civil Action No. 1:19-cv-12125-ADB (D. Mass.), dated Mar. 19, 2020, 100 pages.

*iRobot Corporation v. Sharkninja Operating LLC et al.*, SharkNinja's Invalidity Contentions Appendix E6, Civil Action No. 1:19-cv-12125ADB (D. Mass.), dated Mar. 19, 2020, 135 pages.

JP Patent No. 2000-342496, issued on Dec. 12, 2000, Ichijo (Exhibit No. 1015 in IPR2020-00735).

JP Patent No. 2002-85305, issued on Mar. 26, 2002, Sano et al. (Exhibit No. 1006 in IPR2020-00735).

JP Patent No. 2003-62776, issued on Mar. 5, 2003, Ostu (Exhibit No. 1012 in IPR2020-00735).

Kahney, Robot Vacs Are in the House, wired.com (Jun. 16, 2003), https://www.wired.com/2003/06/robot-vacs-are-in-the-house/, 13 pages.

Konolige, "Saphira Software Manual, Saphira Version 8.0a," SRI International, © 1997, 54 pages.

Koskela et al., "Home Is Where Your Phone Is: Usability Evaluation of Mobile Phone UI for a Smart Home," Lecture Notes in Computer Science, 2004, 3160:74-85 (Exhibit No. 1024 in IPR2020-00735).

Proof of Service of Process of Complaint in Case No. 1:19-cv-12125-ADB, filed Oct. 16, 2019, 9 pages (Exhibit No. 1003 in IPR2020-00735).

Schulz et al., "Web Interfaces for Mobile Robots in Public Places," IEEE Robotics & Automation Magazine, Mar. 2000, 9 pages.

Sempe et al., "Autonomous Robots Sharing a Charging Station with no Communications: A Case Study," Distributed Autonomous Robotic System, 2002, 5:91.

*Sharkninja Operating LLC, Sharkninja Management LLC, and Sharkninja Sales Company, v. iRobot Corporation*, Declaration of Alonzo Kelly, dated Mar. 23, 2020, 115 pages (Exhibit No. 1004 in IPR2020-00735).

*Sharkninja Operating LLC, Sharkninja Management LLC, and Sharkninja Sales Company, v. iRobot Corporation*, Petition for Inter Partes Review of U.S. Pat. No. 10,045,676 in Case No. IPR2020-00735, dated Mar. 23, 2020, 92 pages.

*Sharkninja Operating LLC, Sharkninja Management LLC, and Sharkninja Sales Company, v. iRobot Corporation*, Petitioners' Power of Attorney, Case No. IPR2020-00735, dated Mar. 18, 2020, 2 pages.

Signed Translation Certification of JP 2000-342496, signed by Christopher Field on Nov. 26, 2019, 1 page (Exhibit No. 1017 in IPR2020-00735).

Signed Translation Certification of JP 2002-85305, signed by Christopher Field on Oct. 31, 2019, 1 page (Exhibit No. 1008 in IPR2020-00735).

Signed Translation Certification of JP 2003-62776, signed by Christopher Field on Nov. 1, 2019, 1 page (Exhibit No. 1014 in IPR2020-00735).

Silverman et al., "Staying Alive: A Docking Station for Autonomous Robot Recharging," In the Proceedings of the 2002 IEEE International Conference on Robotics & Automation, May 11-15, 2002, 1050-1055.

(56) References Cited

OTHER PUBLICATIONS

Simmons et al., "Xavier: An Autonomous Mobile Robot on the Web," Robotics and Automation Magazine, Jan. 1999, 7 pages.
Simmons et al., "Xavier: experience with a layered robot architecture," 8 SIGART Bull., 1997, 8:22-33.
Thrun et al., "Experiences with two Deployed Interactive Tour-Guide Robots," In the Proceedings of the International Conference on Field and Service Robotics, 1999, 6 pages.
U.S. Pat. No. 10,045,676, issued on Aug. 14, 2018, Dubrovsky et al. (Exhibit No. 1001 in IPR2020-00735).
U.S. Pat. No. 5,839,156, issued on Nov. 24, 1998, Park et al. (Exhibit No. 1021 in IPR2020-00735).
U.S. Pat. No. 6,611,120, issued on Aug. 26, 2003, Song et al. (Exhibit No. 1019 in IPR2020-00735).
U.S. Pat. No. 6,774,596, issued on Aug. 10, 2004, Bisset (Exhibit No. 1020 in IPR2020-00735).
U.S. Pat. No. 7,133,746, issued on Nov. 7, 2006, Abramson et al. (Exhibit No. 1018 in IPR2020-00735).
US Publication No. 2002/0049521, published on Apr. 25, 2002, Ruffner (Exhibit No. 1009 in IPR2020-00735).
US Publication No. 2002/0152576, published on Oct. 24, 2002, Murray et al. (Exhibit No. 1011 in IPR2020-00735).
US Publication No. 2003/0120389, published on Jun. 26, 2003, Abramson et al. (Exhibit No. 1010 in IPR2020-00735).
Venkatesh, "Smart Home Concepts: Current Trends," University of California, Jul. 1, 2003, 15 pages (Exhibit No. 1023 in IPR2020-00735).

* cited by examiner

REMOTE CONTROL SCHEDULER AND METHOD FOR AUTONOMOUS ROBOTIC DEVICE

CROSS-REFERENCE TO RELATED APPLICATIONS

This application is a continuation of and claims priority to U.S. application Ser. No. 14/670,572, which is a continuation of and claims priority to U.S. application Ser. No. 11/166,891, filed Jun. 24, 2005, which claims priority to and the benefit of U.S. provisional patent application Ser. No. 60/582,531, filed Jun. 24, 2004, the disclosures of which are being incorporated herein by reference in their entirety. This application is related to U.S. patent application Ser. No. 11/166,518, filed Jun. 24, 2008, entitled "Programming and Diagnostic Tool for a Mobile Robot," the disclosure of which is being incorporated herein by reference in its entirety.

FIELD OF THE INVENTION

The present invention relates generally to the field of robotics including the control of an autonomous robotic device and, more particularly, to a remote control device and associated method for inputting schedule information via IR signals to an autonomous robotic device, such as a cleaning robot.

BACKGROUND OF THE INVENTION

Robotic cleaning devices can be used to clean a defined area based on a program stored in the robot's processor. The purpose of these devices is to clean efficiently a room without the need for a user to physically control the cleaning device, or even be in the room when the floor is being cleaned. This can effectively reduce the time necessary for household chores, reduce noise pollution by enabling a room to be cleaned without the need for a user to be present, or enable an elderly or disabled person to clean a room which would otherwise be difficult or impossible to achieve without aid.

A number of methods for achieving this aim are currently in use. For example robotic cleaning devices are available which allow the movement of the robot to be controlled directly by a remote communication device to either follow a path defined by commands from the remote device, or to follow a cleaning path based on a program stored in the robot. These devices however require a user to be present in order to control the motion of the robot or directly implement a stored cleaning mission.

Devices are available which allow a robotic cleaner to be controlled remotely from a separate electronic device, such as a PC with a wireless communication attachment. These devices can therefore be controlled from a scheduling and control application program within the computer, thus allowing the device to operate without the need for a user to be present. These devices require a separate PC to be operational and in linked communication with the robotic device before it can carry out a task and complete a scheduling assignment.

Robotic cleaners are also available which allow a user to directly input scheduling and control information into the robotic device using buttons located on the device itself. As a result, this device can work autonomously once a schedule has been physically input into the robotic device. However, this device does riot allow scheduling information to be communicated to the device from a remote controller. As a result, the device would not completely alleviate the need to physically approach the controller, bend down, and input the scheduling information manually. This could limit the ability of the device to be easily used by a person of limited mobility.

None of the current robotic cleaners allow all the desired functions of a robotic cleaning robot to be enabled from a single remote device, without the need for further external control. The devices currently available require either an external source to control the scheduling function, or a direct physical input of the scheduling information through user inputs on the robotic device itself, Allowing a robotic cleaner to run autonomously a scheduling application without external input, receive updated scheduling and other user applications or information from a portable remote device without direct physical contact, and also allow the robotic cleaner to be directly controlled remotely from the same portable remote device, if and when required, would greatly increase the utility of the robotic cleaner and broaden the range of applications for a user.

From the foregoing, there is a need for a method and apparatus to allow a robotic cleaning device to operate autonomously to a remotely communicated user defined schedule, without the need for a user to be present or for a further control input from an external source. It is also desirable to provide a single portable apparatus that can load the configuration applications into the robotic device, select and communicate scheduling information to the robotic device, and control a function of a robotic device based on a direct user command, to improve the utility, efficiency and usability of a robotic cleaning device.

SUMMARY OF THE INVENTION

The invention provides a method and apparatus for configuring a robotic device to operate according to a user defined schedule. Upon configuration of the robotic device, the method and apparatus allows a user to input scheduling information into the robotic device using a remote communication device, after which the robotic device is capable of operating without any further input from a user or the remote device. The communication device can also be used to control directly a function of the robotic device, or to receive information from the robotic device. One or more implementations of the invention may provide one or more of the following features.

In one embodiment of the invention, a configuration tool can be used to configure a robotic device. This method includes the steps of linking the configuration tool to the robotic device, authenticating the configuration tool, and loading, via the configuration tool, information into the robotic device after successful authentication of the configuration tool. The information loaded into the robotic device can include a scheduling application program to enable a scheduling capability of the device. The loading step also allows the communication device to retro-fit, reprogram, and upgrade the scheduling capability of the robotic device at any time.

In one configuration of the invention, the link connecting the configuration tool to the robotic device can include a communication port in each device, such as but not limited to a serial port, USB port, or other appropriate communication port. The robotic device and the configuration tool can then communicate through a cable plugged into the communication port of each device. In an alternative configuration, the link between the configuration tool and the robotic device can be a direct physical connection, wherein one device includes a male serial port adapter, or other communication port adapter such as a USB connector, which plugs directly into a female port on the other device. In a further alternative configuration, the robotic device and configuration tool may link through a wireless connection, wherein a remote signal, such as an infrared, radio frequency, or other appropriate frequency signal, is used to load information from the configuration tool to the robotic device.

The scheduling application program loaded into the robotic device can enable the robotic device to implement further scheduling information from a remote device. As a result, the robotic device can be enabled to run autonomously based on scheduling information loaded into, and stored in, the robotic device without further user input. One embodiment of the invention allows the remote device to be a hand-held input device that can communicate with the robotic device through a wireless connection.

One embodiment of the invention includes a method for configuring a robotic device for autonomous use, including the steps of selecting scheduling information in a remote device, linking the remote device to the robotic device, authenticating the link, communicating the scheduling information from the remote device to the robotic device, and storing the scheduling information in the robotic device. The link between the robotic device and the remote device can be a wireless connection, or any other linking method, such as those described above.

Once the scheduling information has been stored in the robotic device, it can operate in accordance with this stored scheduling information. As a result, the stored scheduling information enables the robotic device to run autonomously without further user input. In one embodiment, the stored scheduling information can include the date, day, and/or time at which the robotic device should operate, and also the number and type of mission it should run at each scheduled time.

Another embodiment of the invention includes a method of communicating with a robotic device. This method includes the steps of linking a single communication device to the robotic device, authenticating the link, and transmitting information from the communication device to the robotic device, wherein the transmitted information includes controlling a function of the robotic device, and at least one of configuring the robotic device and providing scheduling information for the robotic device. As a result, a single communication device can provide multiple functions for the control, scheduling, and configuration of a robotic device.

In various embodiments of the invention the transmitted information can include control and scheduling information, control and configuration information, or control, configuration and scheduling information. This control, configuration, and scheduling information need not be transmitted at the same time, but can be communicated independently, and at different times to enable one specific aspect of the invention. The communication device used to transmit this information can include, but is not limited to, a hand-held remote device, a PC, a laptop, and a wireless communication device.

In one embodiment of the invention, the method can further include the step of transmitting information from the robotic device to the communication device. This information transmitted from the robotic device can include, but is not limited to, an error report, a power level report, currently stored scheduling information, a status report, authentication information, and a user maintenance report.

One embodiment of the invention provides an apparatus for communicating with a robotic device. This apparatus includes a memory for storing information, at least one port for communicating with the robotic device, at least one authenticator for authenticating the robotic device, and at least one transmitter for transmitting information to the robotic device, via a communication port. The information communicated to the robotic device includes information for controlling a function of the robotic device, and at least one of configuration information and scheduling information for the robotic device. In an alternative embodiment, the apparatus can also receive information transmitted from the robotic device.

The apparatus can be a hand-held remote device, or other communication device, and can further include a wireless communication device. In one embodiment, the apparatus can include a display, allowing a user to view information associated with the running of the apparatus. The apparatus can also include at least one user input, allowing the user, for example, to input information to be communicated to the robotic device, directly control a function of the robotic device through a wireless connection, upload information from the robotic device, or search for or control a function of the remote device itself In various embodiments of the apparatus, the user input can include, but is not limited to, a switch, a joystick, a button, a touch sensitive pad, a roller-ball, and an acoustic input, such as a voice command.

In another embodiment, the invention can include a robotic device that includes a memory for storing information, at least one port for receiving information from a communication device, and at least one authenticator for authenticating the communication device. The communicated information includes information for controlling a function of the robotic device, and at least one of configuration information and scheduling information for the robotic device. This control, configuration, and scheduling information need not be received at the same time, but can be received independently, and at different times, to enable one specific aspect of the invention.

The robotic device is adapted to operate autonomously without further user input based upon scheduling information received from the communication device. Thus, upon loading of a scheduling application program, either preinstalled or by a communication device, a user can enable the robotic device to run autonomously according to the received scheduling information. The robotic device can consist of either a mobile robotic device, such as a cleaning robot, or a stationary robotic device. In one embodiment it can also include at least one transmitter for transmitting information to the communication device.

In yet another aspect, the invention can consist of a robotic system including both a robotic device and a separate communication device for communicating information with the robotic device. The communicated information consists of information for controlling a function of the robotic device, and at least one of configuration information and scheduling information for the robotic device. In one embodiment of the invention, the robotic device can also transmit information to the communication device. In one embodiment, the communication device can be a hand-held remote device, while the robotic device can be either a mobile robotic device or a stationary robotic device.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

The invention provides a method and apparatus for configuring a robotic device to run autonomously according to stored scheduling information. The apparatus includes a communication device that can be used to directly control a function of the robotic device. For example, the communication device can be used to provide directional control to a mobile robotic device such as a cleaning robot. The communication device can also be used to load configuration information, such as a scheduling application program, into the robotic device, such that the robotic device can run autonomously without further user input upon storing user define scheduling information. This scheduling information can also be communicated to the robotic device via the communication device.

Figure 1:
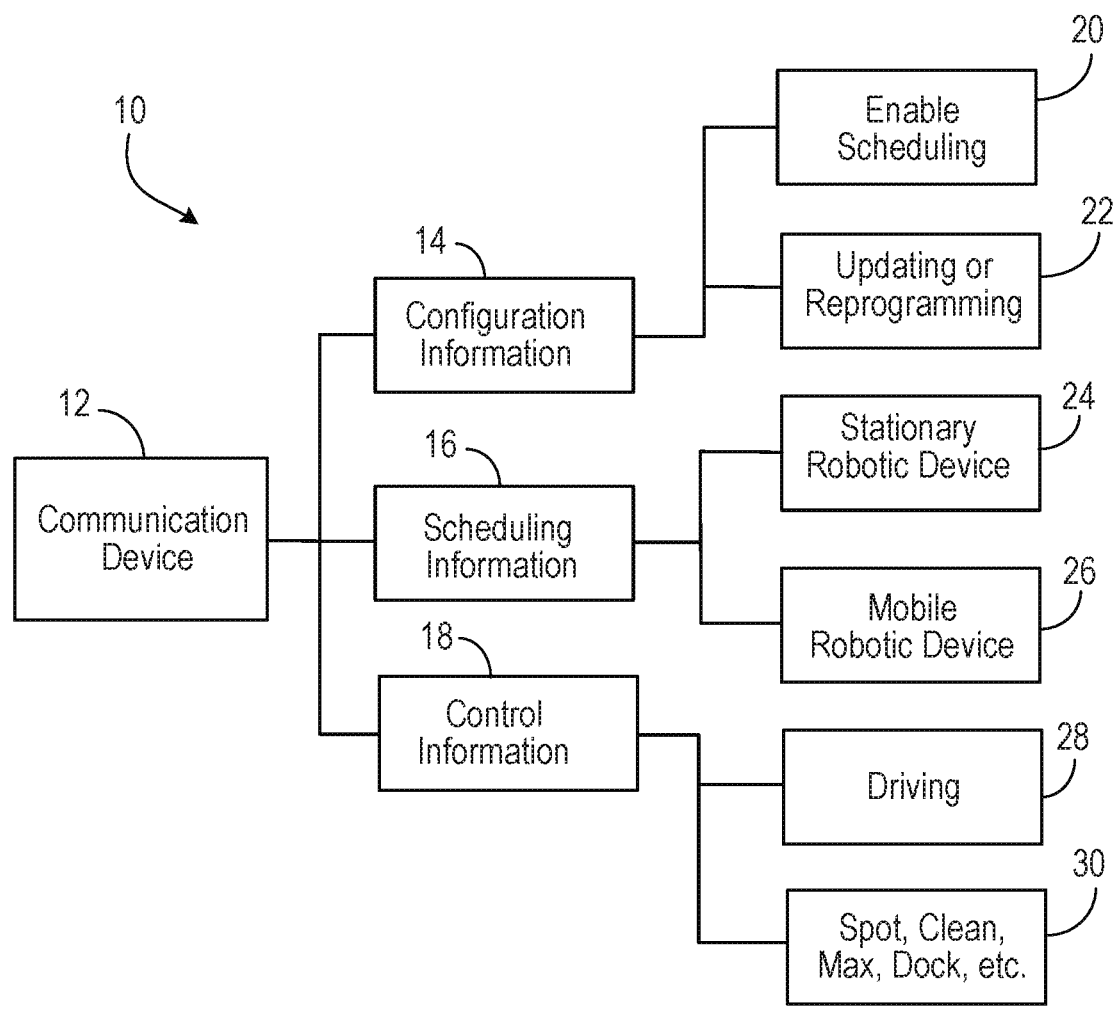
FIG. 1 is a block diagram showing one configuration of the communication device and robotic device system, in accordance with one embodiment of the invention.

FIG. 1 is a block diagram showing one possible configuration of a combined scheduling tool and communication device 10. In this configuration, a single communication device 12 is adapted and configured to carry out multiple tasks related to the scheduling and control of a robotic device. Firstly, the communication device 12 can be linked with a robotic device in order to download configuration information 14 into the robotic device. This configuration information 14 may include a new application program to enable the robotic device to carry out new tasks, or be adapted to enhance the tasks it can already perform. For example, the configuration information 14 can include a scheduling application program 20, to enable the robotic device to carry out a set task at a set time. The task to be performed and time at which it is to be performed can be downloaded with the application program or communicated at a later date through the communication device 12, based on the requirements of the user. The application can also configure the robotic device to receive signals remotely from the communication device 12 in order to enable user defined scheduling.

In one embodiment of the device, this configuration information 14 can be sent through a wireless connection with the robotic device, with the information sent by infrared (IR), radio frequency (RF), or other appropriate signal. In alternative embodiments, the scheduling information could be sent through communication ports linked by a cable (for example a USB or serial port link), or even by a direct physical connection between the communication device 12 and the robotic device. For a direct communication, a male connector (e.g. USB, serial port or other appropriate connection element) on one device mates directly with a female connector on the other device. In further alternative embodiments, the direct communication can include a docking station on the robotic device, such that the communication device can be removeably attached to the robotic device, thus allowing the communication device to act as a direct user interface between a user and the robotic device.

The configuration information 12 can also include information 22 for upgrading the existing capabilities of the robotic device or reprogramming the device to carry out new tasks. This upgrading information 22 can include, but is not limited to, new versions of the software installed in the robotic device, diagnostic information to check the status of the robotic device, and programs to allow the robotic device to send information to the communication device (either prompted by the user or upon the occurrence of a certain event). Further upgrading or reprogramming information 22 can include programs and applications allowing the robotic device to carry out completely new tasks (such as, but not limited to, working as a toy, security device, or searching device for lost objects) or "learning" programs and applications allowing the robotic device to adapt its own programming based on information gained through carrying out specified tasks. These learning programs can, for example, allow a mobile robotic device 26 to map out a room and remember where the objects in the room are placed, or adapt its scheduling based on prior patterns of user behavior.

The communication device 12 can also be configured to communicate scheduling information 16 to a robotic device. In one embodiment, this scheduling information 16 is sent through a wireless connection between the communication device 12 and the robotic device, although again in alternative embodiments, communication ports providing a wired link (such as a USB or serial port link), or a direct physical connection can be used. The scheduling information can be communicated to both a stationary robotic device 24, or a mobile robotic device 26. The mobile robotic device 26 can, for example, be a cleaning robot such as the Roomba® brand floor vacuum sweeper available from iRobot Corporation, Burlington, Mass. The stationary robotic device 24 can, for example, be a portable barrier signal transmitter designed to send an IR beam along a designated path. The mobile robotic device 26 can be configured to change direction upon encountering this signal, thus the IR beam from the portable barrier signal transmitter acts as a "virtual wall" for the mobile robotic device (see U.S. Pat. No. 6,690,134, incorporated herein by reference in its entirety). The stationary robotic device 24 can also be a docking station, home-base, or charging device for the robotic device.

In one embodiment of the invention, scheduling information 16 can be input into the communication device 12 through a user interface of the device 12. This information can then be communicated to a stationary 24 or mobile 26 robotic device through a wireless connection between the communication device 12 and the robotic device. The robotic device stores this information and runs according to the stored scheduling information 16 without the need for any other input from a user, controller or communication device 12. Changes in the scheduling information 16 stored in the robotic device can be made by simply inputting new scheduling information 16 into the communication device 12 and communicating it to the robotic device. In an alternative embodiment, a further step, such as but not limited to clearing the stored scheduling information 16 from the robotic device's memory or inputting a code (either into the communication device 12 or directly into the robotic device), may be required before new scheduling information 16 can be loaded into the robotic device.

In one embodiment of the invention, the robotic device can be configured to provide a visual or audio signal upon the completion of a transfer of configuration or scheduling information. In an alternative embodiment, a return signal can be sent from the robotic device to the communication device 12 upon the successful completion of an information transfer. The robotic device can also be configured to illuminate a status light on either device if and when a scheduling program is stored in the memory.

The scheduling information 16 can include, but not be limited to, the date, day and time at which the robotic device operates, and may also include other information such as the length of time the robotic device should operate during a scheduled event, the mission or task it should carry out for each scheduled operation, and the number of missions or tasks it should carry out during a scheduled operation. The scheduling information can also include more complex calendar based information, such that the robotic device may be able to adjust its start time based on the time of year (for example due to time differences for daylight savings time or for the available hours of daylight), or adjust its schedule for holidays.

A robotic device can be configured or programmed to run a number of separate programs. For example, a mobile cleaning robot can be configured to clean different areas of a room or building, clean a particular spot on a floor, clean at varying power levels between a minimum to a maximum setting, return to a docking station when power drops to a specific level or the dirt compartment is full, or carry out other specific tasks. Using the scheduling information 16, the missions or tasks that the robotic device carries out can then be tailored to a user's requirements, for example by only carrying out a high power cleaning mission at times when nobody is in the house, In one embodiment of the invention, a stationary robotic device 24, such as a portable barrier signal transmitter, can be scheduled to operate at the same time as a mobile cleaning robot, thus saving power. Alternatively, the stationary robotic device 24 may only turn on during some scheduled operations depending on whether a user want to clean the area potentially blocked by the portable barrier signal transmitter or not.

In one embodiment, the communication device 12 can also be used to provide direct control information 18 to a robotic device, based on a user input. This can involve directly driving a function of a robotic device 28, or initiating the robotic device to carry out a preprogrammed mission or task 30. In one embodiment of the invention, the communication device 12 includes a user input, or a number of inputs, such as, but not limited to, switches, a joystick, buttons, a touch sensitive pad, and a roller-ball. Using one of, or a combination of, these user inputs, a user can command the robot to carry out a specific movement or action immediately. For example, the driving information 28 may include, but not be limited to, commands to make a moveable robotic device turn left, turn right, move forward, and move backward. In the specific embodiment of a mobile cleaning robot, the driving information 28 may also include such commands as start and stop cleaning, or clean at a specific power level.

The driving information 28 may also include commands to carry out pre-programmed missions, tasks or actions. For example, the communication device 12 can include buttons or other user inputs that command a robotic device to specific task when the user input is enabled. For a mobile cleaning robot, these task commands 30 could include cleaning a specific spot, carrying out a specified cleaning mission, cleaning at a specific power level, stop and power down, power up, or return to a docking station.

Figure 2A:
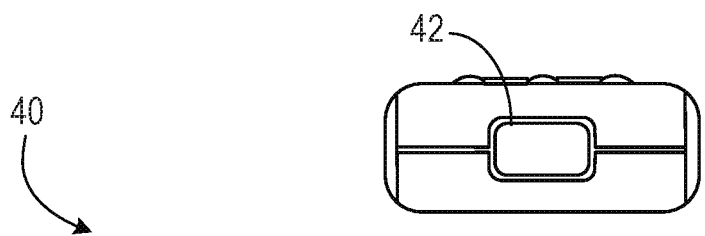
FIG. 2A is a schematic front-end view of the communication device and/or configuration tool, in accordance with one embodiment of the invention.

FIGS. 2A-2E show five views of an example of a particular communication device 40. FIG. 2A shows a front-end view of the communication device 40, showing a wireless communication port 42, allowing the communication device 40 to communicate remotely, using for example IR signals, with a robotic device or other electronic device. The wireless communication port 42 can be used to provide configuration, scheduling, and control information to a robotic device, and optionally also receive information from a robotic or other device.

In one embodiment of the invention, the communication device can be configured to receive a range of information from a robotic device. In the case of a robotic cleaning device, this information can include, but not be limited to, receiving power level or dirt compartment level status reports, error reports, information on when filters, sensors or brushes need to be cleaned, "dirt alerts" when a dirty area of floor is detected, or mission status reports (e.g. mission completed/abandoned/battery depleted, etc.)

Figure 2C:
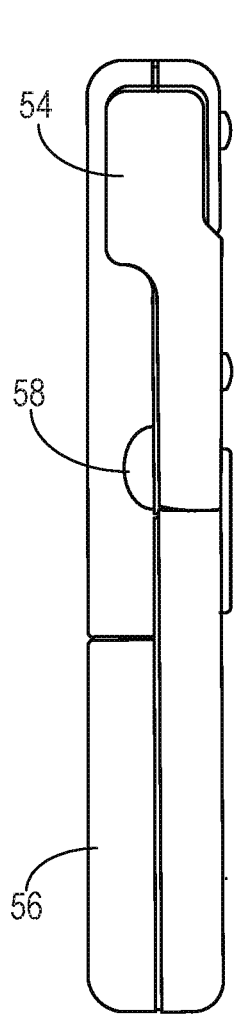
FIG. 2C is a schematic left-side view of the communication device of FIG. 2A.
Figure 2B:
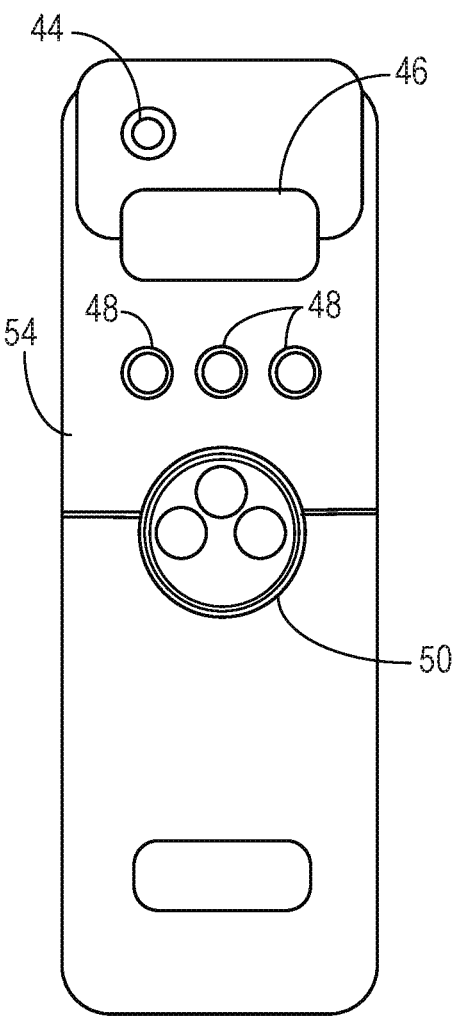
FIG. 2B is a schematic top view of the communication device of FIG. 2A.

FIG. 2B shows a top or plan view of the communication device 40. The communication device 40 includes a number of user input devices, including a button 44, a set of buttons 48, and a second set of buttons 50. Each of these buttons (i.e., switches) can be configured to input different information into the communication device 40, or provide different information to a robotic device. In one embodiment of the invention, the function of these buttons can differ when a front cover or flip lid 54 is in either an open or closed position. In this embodiment, with the front cover 54 open, the buttons can be used to input and store scheduling or other information into the communication device 40, while with the lid 54 closed the buttons can be used to communicate with a robotic device and provide configuration, scheduling, and control information to the robotic device.

In one embodiment, button 44 could be used to initiate the communication of configuration or scheduling information to a robotic device, control a specific task of the robotic device (such as initiating docking), or turn the robotic device, or the communication device 40, on and off. Buttons 48 can be used to provide input information into the communication device 40 when setting up scheduling information, enable the loading of specific configuration information into a robotic device, or control a specific mission, task or action of the robotic device. Buttons 50 may be used to input scheduling information into the communication device 40, enable the loading of configuration or scheduling information into a robotic device, and control a specific action of the robotic device. In one embodiment of the invention the buttons 50 could be used to control directly the movement of a cleaning robot, with the three buttons assigned to turning left, turning right, and moving forward. In an alternative embodiment, one or other of the buttons can also be used to lock the robotic device in a certain mode of operation, or in an "off" setting.

The communication device shown in FIG. 2B also includes a display 46. This display 46 can for example be a liquid crystal display (LCD), allowing the user to see the information being inputted into the communication device 40, showing which configuration information, scheduling information or control information a robotic device is being sent, or for showing information sent from the robotic device to the communication device 40.

FIG. 2C shows a left-side view of the communication device 40. This view shows the side of the flip lid 54 when the lid is closed. This front cover 54 can be used to, but not limited to, change the functions of the user inputs, show or hide portions of the display 46, uncover other hidden user inputs, or uncover instructions for the use of the device. Indentations 58 below the edge of the front cover 54 are included to allow for easy opening of the cover 54 by a user. The casing 56 or the communication device 40 can be made of either metal or plastic, and can include a removable cover to allow access to a battery compartment (not shown).

Figure 2D:
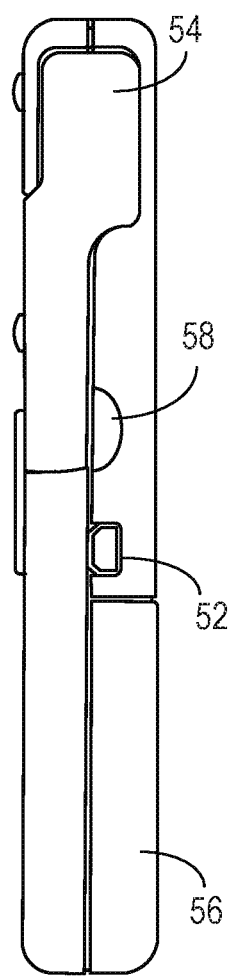
FIG. 2D is a schematic right-side view of the communication device of FIG. 2A.
Figure 2E:
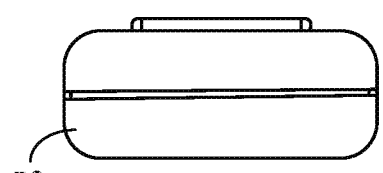
FIG. 2E is a schematic rear-end view of the communication device of FIG. 2A.

FIG. 2D shows a right-side view of the communication device 40. This view includes a communication port 52 to allow the communication device 40 to connect to another device for uploading and downloading information, such as, but not limited to, authenticating information, configuration information, scheduling information, control information, and technical information. The communication port 52 can be, but is not limited to, a serial port, a parallel port, a USB port, an IEEE 1394 "Firewire" port, a PS/2 port, a modern port, or an Ethernet network port.

FIG. 2D shows a rear-end view of the communication device 40. In one embodiment of the invention, the communication device 40 of FIGS. 2A-2E is sized and shaped to fit in a users hand, and can be used in the same manner as a television or video remote control. In an alternative embodiment of the invention, other user input devices can be used as a communication device 40 to communicate with a robotic device. Such alternative devices include, but are not limited to, another hand-held remote device, a stationary remote communication device with user interface, a PC, a laptop computer, and a wireless communication device, such as a mobile phone or personal digital assistant (PDA).

Figure 3:
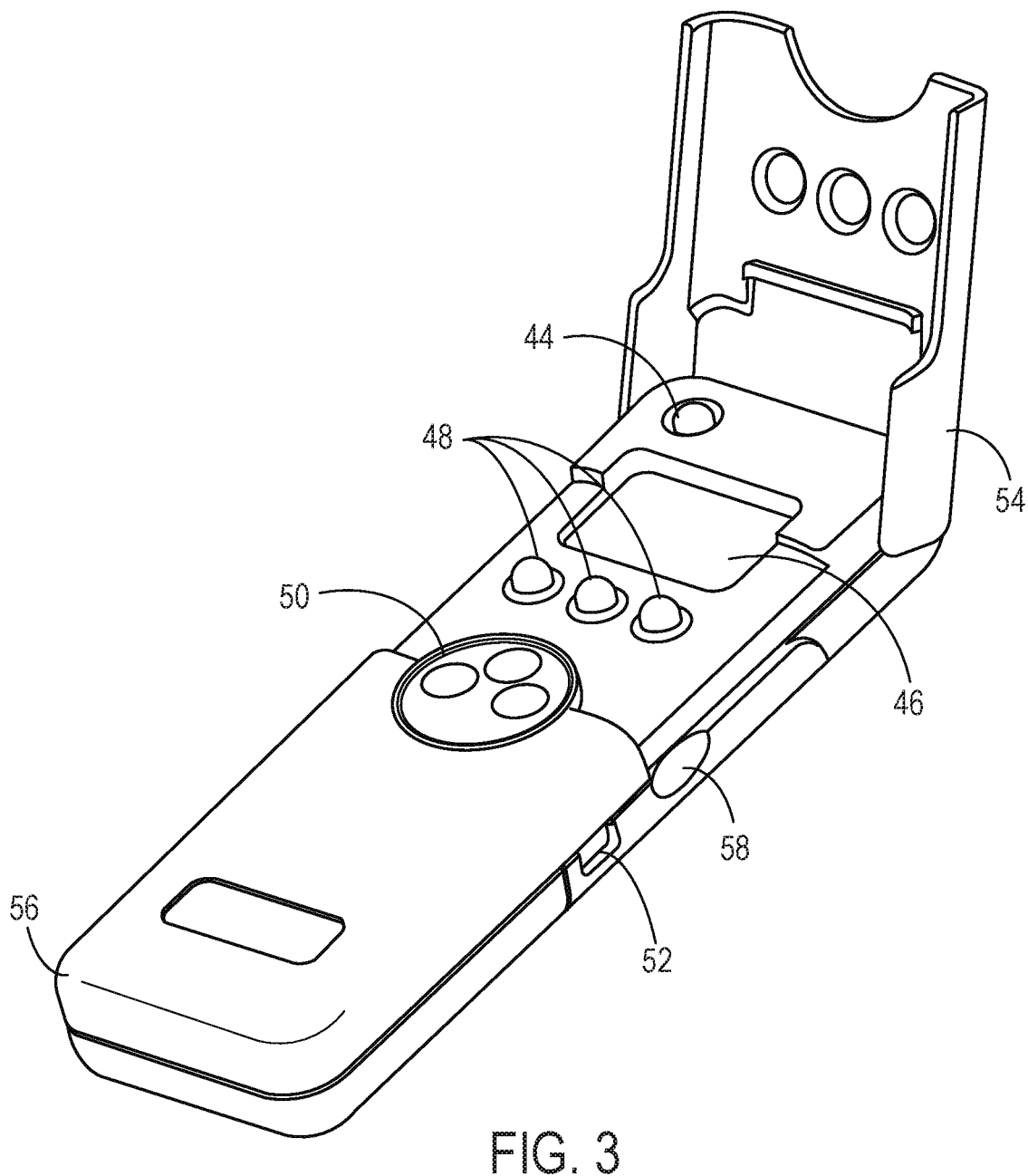
FIG. 3 is a schematic perspective view of the communication device and/or configuration tool with an open front cover, in accordance with one embodiment of the invention.

FIG. 3 is a schematic view of the communication device 40 of FIGS. 2A-2E with an open front cover 54. As previously discussed, the opening of the front cover 54 can be used to, amongst other things, uncover hidden user inputs, change the function of certain user inputs, uncover a portion of the display 46, enable certain "locked" functions of the communication device 40, or uncover instructions printed on the inside of the cover 54.

Figure 4:
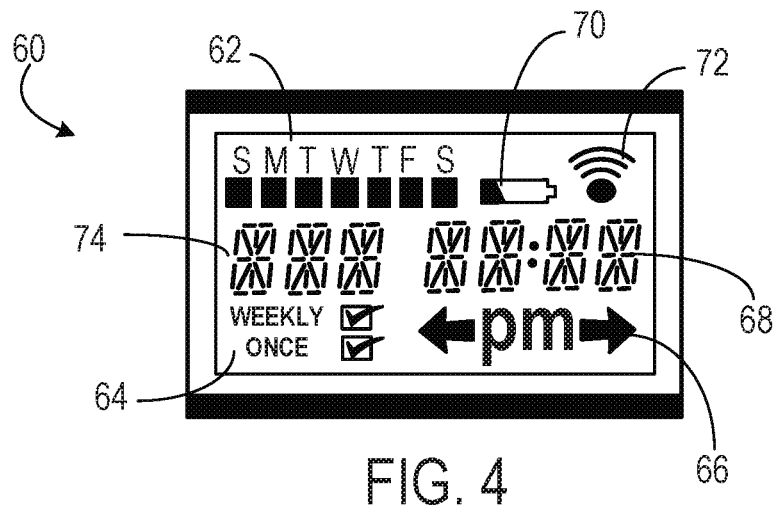
FIG. 4 is a schematic display for a communication device and/or configuration tool, in accordance with one embodiment of the invention.

FIG. 4 is an image of an example display 60 for a communication device. This display 60 includes a day of the week indicator 62, a schedule frequency indicator 64, indicating whether a specific scheduling task is to be performed once or repeatedly on a weekly basis, and time indicators showing whether a scheduled task is to be performed in the "am" or "pm" 66, and at what specific time 68. The display 60 also includes a power indicator 70 and a signal indicator 72 that can indicate when a signal is being communicated from or to the communication device. A further indicator 74 can be used to display additional information, such as, but not limited to, the number of the scheduled task, the type of task to be performed, and the status of a device.

In alternative embodiments of the invention, the display 60 could also be configured to show such things as options for the type of configuration information that can be communicated, the range and type of scheduling information available for a given robotic device, and previously transmitted scheduling information. A display 60 can also be configured to show information received from a robotic device, as discussed above.

Figure 5:
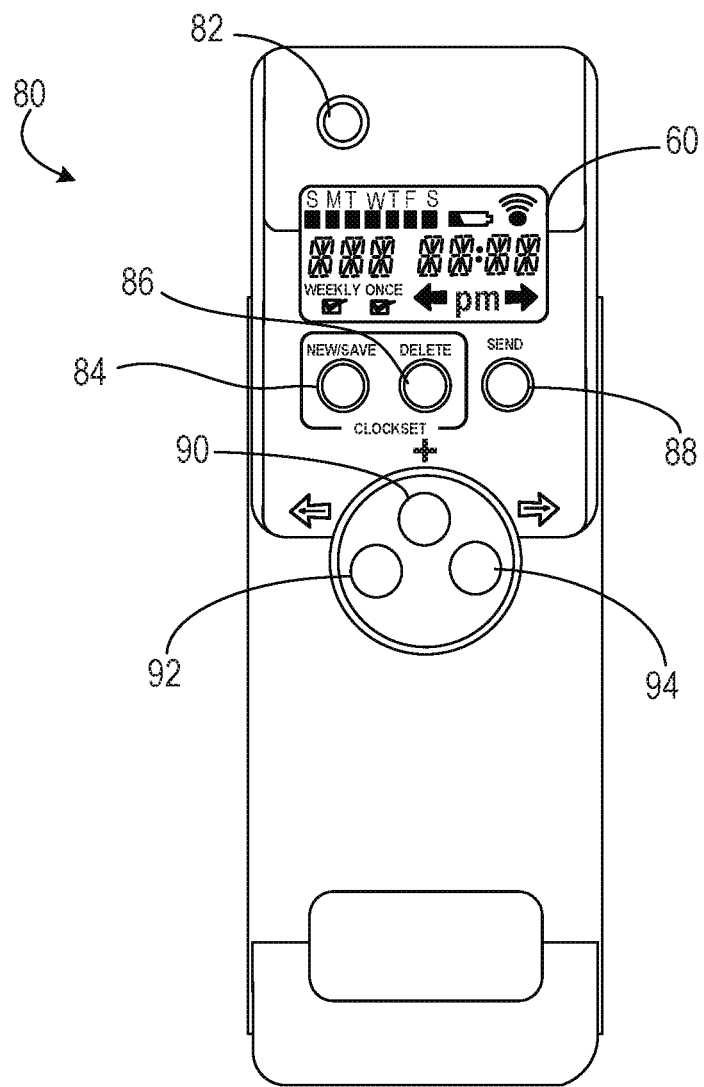
FIG. 5 is a schematic top view of a communication device and/or configuration tool with the display of FIG. 4, in accordance with one embodiment of the invention.

FIG. 5 shows an image of a communication device 80 with the display 60, in accordance with one embodiment of the invention. This configuration conforms generally with the communication device 40 shown in FIGS. 2A-2E and FIG. 3, with the user inputs assigned specific tasks. In this configuration, button 82 is an on/off switch, button 84 enables a new scheduling program or saves an inputted scheduling program, button 86 deletes inputted information, and button 88 enables the communication device 80 to send scheduling information to a robotic device. Further user inputs are configured to provide direct control commands to a mobile robotic device, with button 90 providing a "move forward" command, button 92 providing a "turn left" command, and button 94 providing a "turn right" command to the robotic device. The display 60 unit embedded in the communication device 80 conforms generally with that of FIG. 4.

Figure 6A:
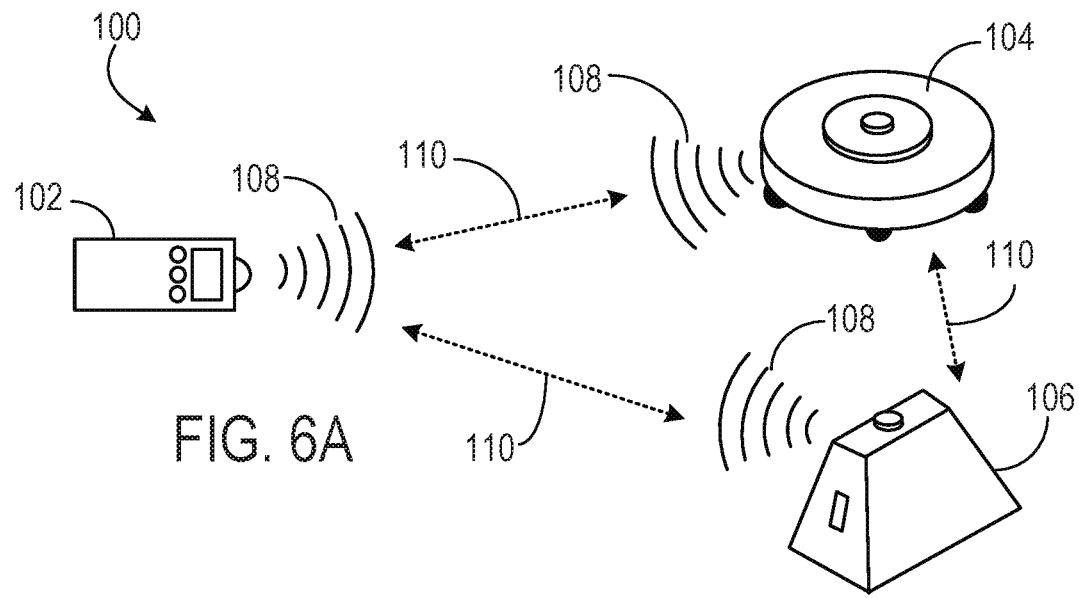
FIG. 6A is a schematic diagram illustrating a communication device in wireless communication with mobile and stationary robotic devices, in accordance with one embodiment of the invention.
Figure 6B:
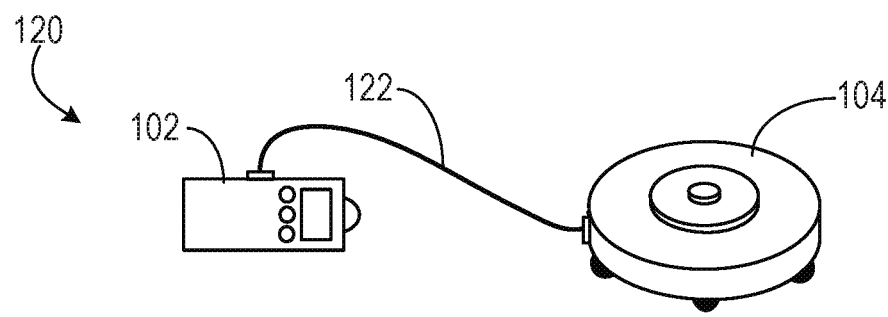
FIG. 6B is a schematic diagram illustrating a communication device in communication, through a communication port and cable, with a mobile robotic device, in accordance with one embodiment of the invention.
Figure 6C:
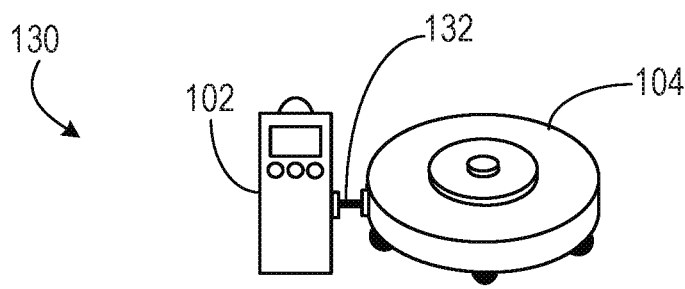
FIG. 6C is a schematic diagram illustrating a communication device in direct physical communication with a mobile robotic device, in accordance with one embodiment of the invention.

FIGS. 6A-6C show various means of linking a communication device with a stationary or mobile robotic device. In the system configuration 100 shown in FIG. 6A, a communication device 102 is configured to communicate through a wireless connection with either or both of a mobile robotic device 104 and a stationary robotic device 106. In one embodiment, the wireless link consists of an IR signal 108, which can be sent from the communication device 102 to the mobile 104 and stationary 106 robotic devices. In this configuration, further IR signals 108 can be sent from the robotic devices to the communication device 102, as indicated by the arrows 110. In this system, configuration, scheduling, and control information can be communicated from the communication device 102 to the mobile 104 and stationary 106 robotic devices, while information such as, but not limited to, status reports and error reports can be communicated back to the communication device 102 from the robotic devices. In alternative embodiments, the communication device 102 can communicate information to a single mobile 104 or stationary 106 robotic device, that can then send the communicated information to further devices directly, without the need for additional linking to the communication device 102. In this configuration, multiple mobile 104 or stationary 106 robotic devices can be configured, scheduled, and/or controlled through a link with only a single robotic device.

In the system configuration 120 shown in FIG. 6B, a mobile robotic device 104 is linked to a communication device 102 through a cable 122. The cable connects both devices through communication ports located on each device. These ports can be a serial port, parallel ports, USB ports, IEEE 1394 "Firewire" ports, PS/2 ports, modem ports, Ethernet network ports, or other appropriate communication ports. In one embodiment of this system configuration 120, the cable connection 122 can be used to quickly load configuration information into a mobile robotic device 104. This system configuration 120 can also be used to load configuration information into a stationary robotic device 106. This configuration information can be used to either enable a new scheduling function on the robotic device, or upgrade or reprogram existing functions of the robotic device, as discussed above. After the configuration information has been loaded through the cable 122, the cable 122 can be removed. Further scheduling information and control information can then be communicated to the robotic device using a wireless connection, as shown in system configuration 100 and FIG. 6A.

In the system configuration 130 shown in FIG. 6C, a mobile robotic device 104 is linked to a communication device 102 through a direct connection 132. This direct connection can consist of a male connection port on the communication device 102, that mates directly to a female connection port on the mobile robotic device 104. Again, this system configuration 130 can also be used to link the communication device 102 to a stationary robotic device 106. As in system configuration 120, shown in FIG. 6B, this system configuration can be used to load configuration information into a robotic device, after which scheduling or control information can be communicated to the robotic device through the wireless communication configuration 100 shown in FIG. 6A. In one embodiment of the invention, the male connection port on the communication device 102 can retract or fold into the communication device 102 when not in use.

Figure 7:
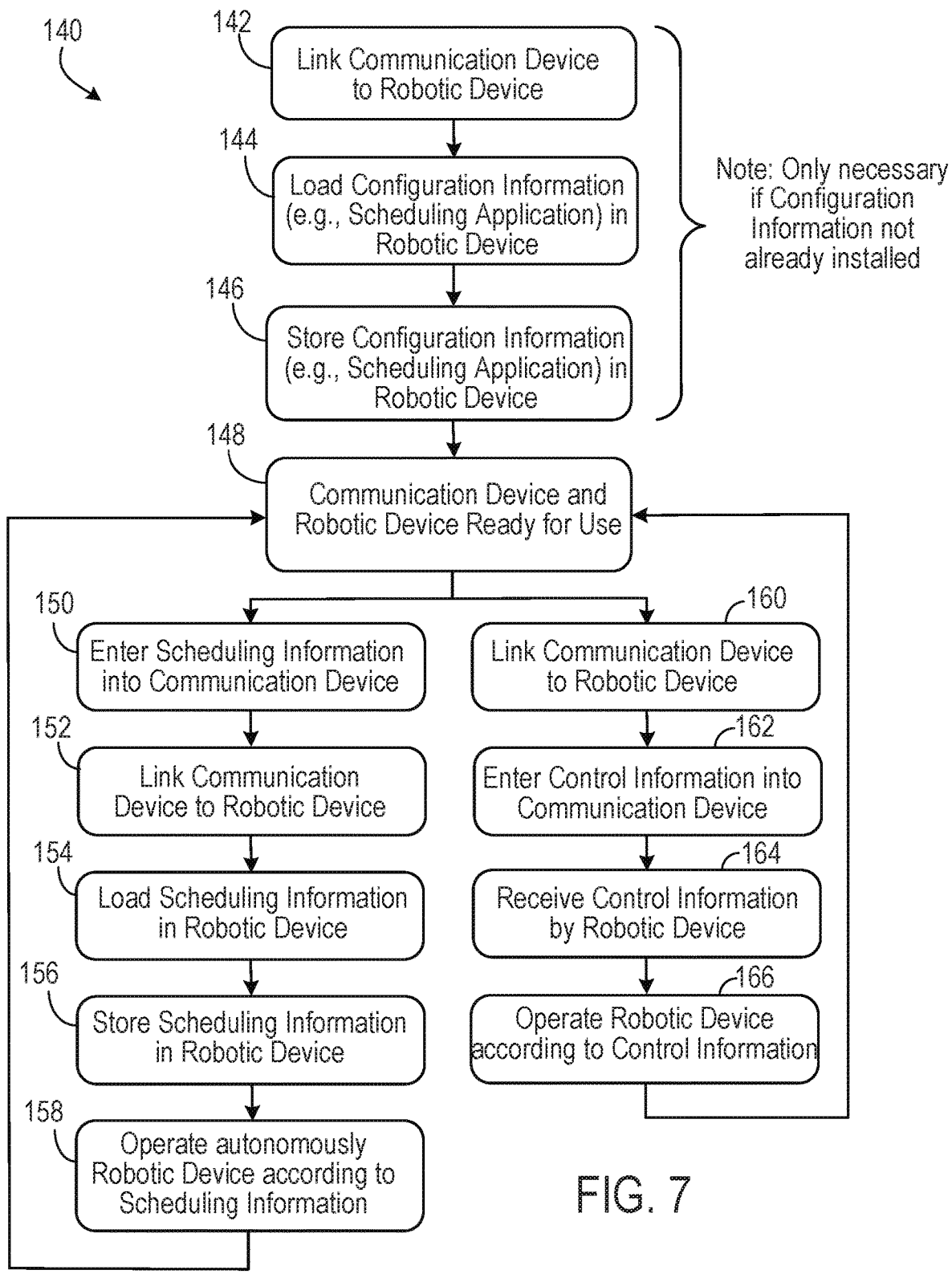
FIG. 7 is a block diagram featuring a method for implementing and using a system including a robotic device and a communication device, in accordance with one embodiment of the invention.

FIG. 7 shows a block diagram featuring one method 140 for implementing and using a system including a robotic device and a communication device. In this method 140, a single communication device can be used to provide configuring, scheduling, and control information to a robotic device.

For a robotic device without a pre-installed scheduling application program, or a robotic device needing reprogramming or upgrading, the communication device can be used to load the required configuration information into the robotic device. This requires first linking 142 the communication device to the robotic device, either through a wireless connection, communication port, or direct connection. Upon optional authentication of the link using an authenticator (e.g., by hardware or software based systems), the desired configuration information can be loaded 144 into the robotic device, at which time it is stored 146 in memory of the robotic device. After this has been completed, the robotic device is ready for use 148. For robotic devices that have already been configured, steps 142, 144, and 146 are not necessary.

Once the robotic device and communication device are ready for use 148, the communication device can be used to provide scheduling information or direct control information to the robotic device. In one embodiment, this information is communicated through a wireless link, although a communication port link or direct link is also possible.

For enabling the robotic device to run according to a user defined schedule, the scheduling information is first entered into the communication device 150. The communication device can then be linked 152 to the robotic device and, upon optional authentication of this link, the scheduling information can be loaded 154 into the robotic device and stored 156 in the device's memory. The robotic device is then free to run autonomously 158, based on this stored scheduling information. Depending on the schedule, the robotic device can start immediately or at a future time.

As well as providing scheduling information to a robotic device, the communication device can also directly control one or more function of the robotic device. Again, with the communication device and robotic device ready for use 148, a link can be formed 160 between the communication device and robotic device. Once the link has been authenticated, control information entered 162 into the communication device is received 164 immediately by the robotic device, which then operates 166 according to the user inputted control information.

The scheduling and control functions can run independently, such that the robotic device can be controlled by the user even when the robotic device is not scheduled to run, and alternatively run a scheduled mission without any need for control information. In one embodiment of the invention, the control function can be configured to overrule the scheduling function, so that during a scheduled event a user can take direct control of the robotic device without waiting until the scheduled task is completed. In an alternative embodiment, the scheduling function can be set as the dominant function, and thus upon the start of a scheduled task overrule any direct user control information being communicated at that time.

It should be noted that these functions can at any time be modified or updated by downloading new configuration information into the robotic device. In one embodiment of the invention the communication device can also be configured, updated or reprogrammed by linking the communication device to another device, such as but not limited to a PC, laptop, or other programming or diagnostic tool. As a result, both the communication device and the robotic device can be constantly updated to meet the requirements of the user and advancements developed by the system manufacturers or suppliers.

The invention may be embodied in other specific forms without departing form the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:
1. A robotic system comprising:
   a stationary charging device; and
   an autonomous cleaning robot including a vacuum system, the autonomous cleaning robot configured to:
      initiate, according to scheduling information, a cleaning operation in which the autonomous cleaning robot autonomously navigates about a floor surface to clean the floor surface according to a vacuum power level;
      receive, from a user operable remote device, a command to initiate a docking operation in which the autonomous cleaning robot returns to the stationary charging device to dock at the stationary charging device;
      send a return signal, to the user operable remote device, upon receiving the command to initiate the docking operation; and
      initiate the docking operation in which the autonomous cleaning robot autonomously returns to the stationary charging device.

2. The robotic system of claim 1, wherein the stationary charging device is configured to store the scheduling information.

3. The robotic system of claim 1, wherein the scheduling information is indicative of a future time at which the autonomous cleaning robot initiates the cleaning operation.

4. The robotic system of claim 1, wherein the stationary charging device includes a transmitter configured to send an infrared signal along a designated path, and wherein the autonomous cleaning robot is configured to change movement direction based on sensing the infrared signal.

5. The robotic system of claim 1, wherein the autonomous cleaning robot is configured to receive drive information to move the autonomous cleaning robot forward, left, right, or backward.

6. The robotic system of claim 1, wherein the autonomous cleaning robot is configured to receive a command to initiate a spot cleaning operation to clean a spot on the floor surface.

7. The robotic system of claim 1, wherein the autonomous cleaning robot is configured to receive control information indicative of a length of time for which the autonomous cleaning robot is to perform the cleaning operation.

8. The robotic system of claim 1, wherein the user operable remote device comprises user input buttons operable to cause the user operable remote device to transmit control information to specify the vacuum power level at which the autonomous cleaning robot is to perform the cleaning operation.

9. The robotic system of claim 1, wherein the user operable remote device is a hand-held remote device separate from the autonomous cleaning robot and separate from the stationary charging device.

10. A method of controlling operations of an autonomous cleaning robot, the method comprising:
wirelessly receiving, from a user operable remote device, information including a command to initiate a cleaning operation;
initiating departure from a stationary charging device at which the autonomously cleaning robot is docked and navigating about a floor surface to clean the floor surface in accordance with the command to initiate the cleaning operation;
wirelessly receiving, from the user operable remote device, a command to initiate a docking operation;
initiating the docking operation to return the autonomous cleaning robot to the stationary charging device; and
wirelessly sending, to the user operable remote device, a return signal upon receiving the command to initiate the docking operation.

11. The method of claim 10, further comprising:
wirelessly receiving, from the user operable remote device, drive information to move the autonomous cleaning robot forward, left, right, or backward; and
initiating movement of the autonomous cleaning robot in accordance with the drive information.

12. The method of claim 10, further comprising:
wirelessly receiving, from the user operable remote device, control information indicative of a length of time for which the autonomous cleaning robot is to perform the cleaning operation; and
performing the cleaning operation in accordance with the control information indicative of the length of time.

13. The method of claim 10, wherein the command to initiate the cleaning operation is received in response to the user operable remote device being operated.

14. The method of claim 12, wherein the control information is received in response to the user operable remote device being operated.

15. The method of claim 10, further comprising:
wirelessly receiving a command to initiate a spot cleaning operation; and
initiating the spot cleaning operation to clean a spot on the floor surface.

16. The robotic system of claim 1, wherein the autonomous cleaning robot is further configured to send, to the user operable remote device, a mission status report.

17. The robotic system of claim 1, wherein the autonomous cleaning robot is further configured to send, to the user operable remote device, a vacuum power level report.

18. The robotic system of claim 1, wherein the autonomous cleaning robot is further configured to send, to the user operable remote device, an error report.

19. The robotic system of claim 1, wherein the autonomous cleaning robot is further configured to illuminate an indicia on the autonomous cleaning robot upon receiving information from the user operable remote device.

20. An autonomous cleaning robot comprising:
a vacuum system; and
a communication device configured to:
initiate, according to scheduling information, a cleaning operation in which the autonomous cleaning robot autonomously navigates about a floor surface to clean the floor surface according to a vacuum power level;
receive, from a user operable remote device, a command to initiate a docking operation in which the autonomous cleaning robot returns to a stationary charging device to dock at the stationary charging device;
send a return signal, to the user operable remote device, upon receiving the command to initiate the docking operation; and
initiate the docking operation in which the autonomous cleaning robot autonomously returns to the stationary charging device.

21. The autonomous cleaning robot of claim 20, wherein the autonomous cleaning robot is further configured to send, to the user operable remote device, a mission status report.

22. The autonomous cleaning robot of claim 20, wherein the autonomous cleaning robot is further configured to send, to the user operable remote device, a vacuum power level report.

23. The autonomous cleaning robot of claim 20, wherein the autonomous cleaning robot is further configured to send, to the user operable remote device, an error report.

24. The autonomous cleaning robot of claim 20, further comprising an illuminable indicia, wherein the autonomous cleaning robot is configured to illuminate the illuminable indicia upon receiving information from the user operable remote device.

* * * * *

UNITED STATES PATENT AND TRADEMARK OFFICE
CERTIFICATE OF CORRECTION

PATENT NO. : 10,893,787 B2
APPLICATION NO. : 15/340250
DATED : January 19, 2021
INVENTOR(S) : Zivthan A. Dubrovsky et al.

Page 1 of 1

It is certified that error appears in the above-identified patent and that said Letters Patent is hereby corrected as shown below:

On the Title Page

Column 2, Abstract Line 7 – Delete "farther" and insert -- further --, therefor.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*